United States Patent [19]

Mansfield, Jr et al.

[11] Patent Number: 5,530,939
[45] Date of Patent: Jun. 25, 1996

[54] METHOD AND SYSTEM FOR BROADCASTING AND QUERYING A DATABASE USING A MULTI-FUNCTION MODULE

[75] Inventors: William H. Mansfield, Jr, Pittstown; John E. Raitaz, Morristown, both of N.J.

[73] Assignee: Bell Communications Research, Inc., Morristown, N.J.

[21] Appl. No.: 314,757

[22] Filed: Sep. 29, 1994

[51] Int. Cl.$^6$ .......................... G06F 15/16; G06F 13/00
[52] U.S. Cl. ................................... 395/600; 364/DIG. 1; 364/282.1; 364/284; 364/284.3
[58] Field of Search ....................... 395/600; 364/DIG. 1

[56]     References Cited

U.S. PATENT DOCUMENTS

| | | | |
|---|---|---|---|
| 4,710,926 | 12/1987 | Brown et al. | 371/9 |
| 4,868,866 | 9/1989 | Williams, Jr. | 380/49 |
| 4,870,568 | 9/1989 | Kahle et al. | 395/600 |
| 5,050,075 | 9/1991 | Herman et al. | 364/200 |
| 5,058,002 | 10/1991 | Nakamura et al. | 364/200 |
| 5,152,011 | 9/1992 | Schwob | 455/158.5 |
| 5,230,073 | 7/1993 | Gaussman et al. | 395/600 |
| 5,263,156 | 11/1993 | Mansfield, Jr. et al. | 395/600 |
| 5,270,701 | 12/1993 | Ito et al. | 340/825.03 |
| 5,388,259 | 2/1995 | Fleichman et al. | 395/600 |
| 5,393,713 | 2/1995 | Schwob | 455/158.5 |
| 5,491,838 | 2/1996 | Takahisa et al. | 455/66 |

OTHER PUBLICATIONS

T. F. Bowen, G. Gopal, G. Herman, T. Hickey, K. C. Lee, W. H. Mansfield, J. Raitz, and A. Weinrib; "The Datacycle Architecture" Communications of the ACM, Dec. 1992, vol. 35 No. 12.

Priti Mishra and Margaret H. Eich; "Join Processing in Relational Databases"; ACM Computing Surveys, vol. 24, No. 1., Mar. 1992.

Primary Examiner—Thomas G. Black
Assistant Examiner—Jean R. Homere
Attorney, Agent, or Firm—Leonard Charles Suchyta; James W. Falk

[57]              ABSTRACT

A broadcast database system module (300) is disclosed having a processor (310) and a memory subsystem (320). The processor (310) and memory subsystem (320) of the broadcast database system module (300) can cooperate to provide all functions of a broadcast database system (200, 400) such as the pump function, data filter function, database mirror function, snapshot function, etc. The memory subsystem (320) can transfer attribute information of broadcasted tuples to the processor (310) and the processor (310) can execute queries against the attribute information of tuples. Alternatively or additionally, the memory subsystem (320) stores all or part of a database and broadcasts all or part of this database information stored therein. Likewise, the processor (310) can maintain a database stored in the memory subsystem (320) according to instructions to add information to, delete information from, or modify information in, the database.

12 Claims, 9 Drawing Sheets

FIG. 1
(PRIOR ART)

| | 2-1 | 2-2 | 2-3 | 2-4 | 2-5 | 2-6 |
|---|---|---|---|---|---|---|
| | NAME | AGE | WEIGHT | HEIGHT | SOC-SEC | TEL. |
| 3-1 | SMITH | 21 | 150 | 170 | 999-12-3406 | 1234 |
| 3-2 | JONES | 5 | 70 | 107 | 999-12-3456 | 2345 |
| 3-3 | JOHNSON | 26 | 175 | 172 | 999-34-5678 | 3456 |
| 3-4 | KRANE | 35 | 160 | 165 | 999-45-6789 | 4567 |
| 3-5 | CARTWRIGHT | 71 | 145 | 167 | 999-56-7891 | 5678 |
| 3-6 | KOOP | 65 | 160 | 175 | 999-67-8912 | 6789 |
| 3-7 | AMES | 58 | 172 | 183 | 999-78-9123 | 7890 |
| 3-8 | BROWN | 32 | 189 | 178 | 999-89-1234 | 8901 |
| 3-9 | SEBASTIAN | 31 | 206 | 185 | 999-91-2345 | 9012 |
| 3-10 | LEE | 40 | 171 | 180 | 999-98-7654 | 0123 |
| 3-11 | MOORE | 46 | 121 | 165 | 999-97-6543 | 0987 |
| 3-12 | PERSOD | 15 | 158 | 167 | 999-76-5432 | 1098 |

RELATION A

| | 4-1 | 4-2 | 4-3 |
|---|---|---|---|
| | SOC-SEC | COURSE | GRADE |
| 5-1 | 999-12-3456 | 101 | 95 |
| 5-2 | 999-12-3456 | 211 | 86 |
| 5-3 | 999-67-8912 | 101 | 74 |
| 5-4 | 999-98-7654 | 312 | 90 |
| 5-5 | 999-97-6543 | 101 | 85 |
| 5-6 | 999-97-6543 | 211 | 87 |
| 5-7 | 999-97-6543 | 312 | 92 |

RELATION B

FIG. 2
(PRIOR ART)

|   | 6-1 NAME | 6-2 AGE | 6-3 SOC-SEC | 6-4 TEL | 6-5 COURSE | 6-6 GRADE |
|---|---|---|---|---|---|---|
| 7-1 | JONES | 5 | 999-12-3456 | 2345 | 101 | 95 |
| 7-2 | JONES | 5 | 999-12-3456 | 2345 | 211 | 86 |
| 7-3 | KOOP | 65 | 999-67-8912 | 6789 | 101 | 74 |
| 7-4 | LEE | 40 | 999-98-7654 | 0123 | 312 | 90 |
| 7-5 | MOORE | 46 | 999-97-6543 | 0987 | 101 | 85 |
| 7-6 | MOORE | 46 | 999-97-6543 | 0987 | 211 | 87 |
| 7-7 | MOORE | 46 | 999-97-6543 | 0987 | 312 | 92 |

METHOD AND SYSTEM FOR BROADCASTING AND QUERYING A DATABASE USING A MULTI-FUNCTION MODULE

RELATED APPLICATIONS

The following U.S. patents and patent applications are assigned to the assignee hereof and contain subject matter related to the subject matter of the present application:

1. U.S. Pat. No. 5,050,075, entitled "High performance VLSI Data Filter", filed for Gary Herman, K. C. Lee and Takako Matoba on Oct. 4, 1988 and issued Sep. 17, 1991;
2. U.S. Pat. No. 5,230,073, entitled "Architecture for a Storage Access System for High Performance Computer Systems," filed for E. J. Gaussman, K. S. Grewal and G. E. Herman on Jun. 6, 1989 and issued Jul. 20, 1993;
3. U.S. Pat. No. 5,263,156, entitled "Parallel, Distributed Optimistic Concurrency Control Certification Using Hardware Filtering", filed for William H. Mansfield, Jr. and Thomas F. Bowen on Dec. 20, 1991 and issued Nov. 16, 1993;
4. U.S. patent application Ser. No. 07/630,557, entitled "System and Method for Updating Database Values Without Locks", filed for William H. Mansfield, Jr. and Thomas F. Bowen on Dec. 20, 1900, now abandoned in favor of continuation application Ser. No. 08/171,226, filed Dec. 21, 1993 and
5. U.S. patent application Ser. No. 07/883,098 entitled "System and Method for Performing Imprecise Database Queries," filed for William H. Mansfield, Jr. and Robert M. Fleischman on May 15, 1992 now Pat. No. 5,388,259, issued Feb. 7, 1995.

The contents of the above-listed patents and patent applications are incorporated herein by reference.

FIELD OF THE INVENTION

The present invention relates to a system and method for managing a database and for processing database queries. More particularly, the present invention is directed to a modular broadcast database system architecture. Each broadcast database system module can operate as a, stand-alone broadcast database system. In other words, each module can act as a broadcast source of the database and execute queries for selecting data from the broadcast. Furthermore, each module can serve as a building block of a larger broadcast database system. In such a system, one or more modules can act as a broadcast source of the database and one or more modules can execute queries against the database. The modules of the larger system may each perform only one or more specific function or may perform alternate functions.

BACKGROUND OF THE INVENTION

A database is defined as a collection of data items, organized according to a data model, and accessed via queries. The present invention applies to any data model. The invention is illustrated using a relational database model.

A relational database may be organized into a two dimensional table containing rows and columns of information. In a relational database or relation, data values are organized into columns or fields. Each column of the relation corresponds to a particular attribute and has a domain which comprises the data values of that attribute. Each row of a relation, which includes one value from each attribute, is known as a record or tuple.

FIG. 1 shows an exemplary relational database (prior art) consisting of two relations A and B. The relation A of FIG. 1 contains data pertaining to a population group. The relation A has six attributes or columns 2-1, 2-2, 2-3, 2-4, 2-5 and 2-6, for storing, respectively, name, age, weight, height, social security number and telephone extension data values of the population. The database also has twelve records or tuples 3-1, 3-2, 3-3, ..., 3-12. Each tuple 3-1, 3-2, 3-3, ..., 3-12 has one data value from each attribute. For instance, the tuple 3-10 has the name attribute value "lee", the age attribute value 40, the weight attribute value 171, the height attribute value 180, the social security number attribute value 999-98-7654 and the telephone extension attribute value 0123. Furthermore, the relational database has a second relation B which contains three attributes 4-1, 4-2, an 4-3 for storing, respectively, social security number, course number and grades. The relation B contains seven tuples 5-1, 5-2, 5-3, ..., 5-7.

Often, it is desirable to identify and/or retrieve tuples which meet criteria of interest. Queries are used to retrieve tuples of interest from a relation using selection operations. Selection operations incorporate predicates. Predicates are logical or mathematical expressions for specifying the criteria which must be satisfied by the tuples in order to be selected. For instance, it may be desired to select all tuples of a relation R having an attribute I value which is the same as some constant J. Such a select operation is denoted $R \cdot I = J$ or $S_{R,I=J}$. The selection operation is specified by the predicate "I=J". The predicate, in turn, incorporates the selection operator "equals" for specifying the desired criteria that the selected tuples must satisfy. Other selection operators include "greater than," "less than," etc. Additionally, individual predicate terms may be combined with logical operators "AND," "OR" "NOT" etc. to form complex predicates.

A transaction is defined as a program that includes database operations. The collection of tuples obtained through select operations of a transaction against the database is known as a transactions read-set. The set of tuples either modified, added, or deleted through modification, addition or deletion operations of a transaction against the database is known as a transaction writeset.

A database system is an apparatus which maintains a database and executes queries against the database. Advantageously, the database system supports certain advanced functions and features. For instance, the database system preferably includes a device which performs a "database mirror" function or a device which performs a "database snapshot" function, or both. Furthermore, the database system also illustratively supports the "database trigger" and "relational join" features. Each of these functions and features is described below.

A database mirror is a device which dynamically maintains an up-to-date back-up copy of the database and optimally is located in a separate physical remote location. The database mirror is preferably a separate physical device from the primary store/source of the database. In addition to maintaining an up-to-date copy of the database, the database mirror assumes the function of the primary database store/source in the event the primary database store/source fails.

A data base snapshot is a copy of all or part of the database that is isolated from update activity. Database snapshots are often used when a series of queries are to be processed and where the database must not change during the processing of those queries. Database snapshots are also used to permit simultaneous query processing against a copy of a database in situations where the processing capacity of the primary copy is utilized entirely to support transaction processing. Database snapshots may contain the entire database, or may contain a subset of the database as defined by specific selection predicates.

Database trigger procedures are procedures that are periodically applied to a database and whose results may vary depending on changes to the database. For instance, the database may include continually updated stock price data. A trigger procedure may be provided which causes a buy or sell order to occur in the event specific stock prices rise above or fall below certain thresholds.

A relational join operation operates on two or more argument relations with a join predicate to form a third relation. A common use of the join operation is to form an "intersection relation." That is, if two relations have a common attribute, called the join attribute, a join operation can be used to construct a third relation containing tuples formed from tuples of each of the two argument relations that satisfy the join predicate. For example, consider the join operation:

Select (Name, Age, Soc_Sec, Tel, Course, Grade) from A,B where A.Soc_Sec=B.Soc_Sec as applied to the argument relations A and B as defined in FIG. 1. This operation joins attributes A.Name, A.Age, A.Soc_Sec., and A.Tel from the tuples of Relation A with attributes B.Course and B.Grade of the relation B where the value of the A.Soc_Sec join attribute in tuples of Relation A equals the value of the B.Soc_Sec join attribute in tuples of Relation B. As a result, a relation C is constructed as shown in FIG. 2 (prior art). The relation C has six attributes: 6-1, 6-2, . . . 6-6 for C.Name, C.Age, C.Soc_Sec, C.Tel, C.Course and C.Grade, respectively, and has seven tuples 7-1, 7-2, . . . , 7-7. Each tuple of Relation C is formed from attributes in Relation A tuples and attributes in Relation B tuples which have the same Soc_Sec join attribute values.

A broadcast database system is a system for storing a database in one computing environment, for broadcasting all or parts of the database to other computing environments, and for performing database selection operations at those other computing environments in order to obtain the read-sets for queries. See T. BOWEN, G. GOPAL, G. HERMAN, T. HICKEY, K. C. LEE, W. MANSFIELD, JR., J. RAITZ & A. WEINRIB, "The Datacycle Architecture," COMMUNICATIONS OF THE ACM, SPECIAL ISSUE ON INFORMATION FILTERING (1992). FIG. 3 shows a broadcast database system called the "Datacycle" which supports database management, query processing and transaction processing functions. As shown, a general purpose computer 10 is connected to a broadcast database system 30 via a bus 18. By means of this interconnection, the general purpose computer 10 and the broadcast database system 30 can communicate with each other. For instance, the general purpose computer 10 may transfer queries inputted by a user at the general purpose computer 10 to the broadcast database system 30 for execution. The broadcast database system 30 can return the read-set of the query to the general purpose computer 10 for output to the user. In addition, the general purpose computer 10 can transfer database management instructions to the broadcast database system 30. For instance, the general purpose computer 10 can transfer a write-set of tuples and instructions for adding to, deleting from, or modifying, the database using the write-set of tuples.

As shown, the broadcast database system 30 includes a processor 34 connected to a database memory 32 by a connection 33. The database memory 32 stores the database. By means of the connection 33, the processor 34 can access the database memory 32 for purposes of adding tuples to, deleting tuples from, or modifying tuples in, the database.

The database memory 32 is connected via a connection 36 to a selection system 40 such as the selection system disclosed in U.S. Pat. No. 5,230,073. In the selection system 40, a transmitter 41 cyclically retrieves the contents of the memory 32. The transmitter 41 transmits over a downstream broadcast channel or shared distribution medium 42 a bitstream containing the tuples of the database.

A plurality of filter subsystems 43-1, 43-2, . . . , 43-n, such as those disclosed in U.S. Pat. No. 5,050,075, are connected to the shared distribution medium 42. As depicted, each filter subsystem 43-1, 43-2, . . . , 43-n is connected in parallel to the shared distribution medium 42. Each filter subsystem 43-1, 43-2, . . . , 43-n illustratively comprises a high speed comparator and sufficient arithmetic circuitry for performing on the fly, i.e., real time, arithmetic and logical computations on the tuples broadcasted on the shared distribution medium. Illustratively, the processor 34 is capable of programming the filter subsystems 43-1, 43-2, . . . , 43-n so that they select tuples in accordance with queries received from the general purpose processor 10. The filter subsystems 43-1, 43-2, . . . , 43-n may thus retrieve selected tuples or simply perform computations on tuples and output resulting values. Tuples or resulting values outputted by the filter subsystems 43-1, 43-2, . . . , 43-n are transferred to the processor 34 via a communications channel 44.

In operation, the general purpose computer 10 transfers a query for execution to the processor 34. The processor 34 programs the filter subsystems 43-1, 43-2, . . . , 43-n for performing computations on each tuple broadcasted on the shared distribution medium 42 in accordance with the query. The transmitter 41 then cyclically retrieves the tuples stored in the database memory 32 and broadcasts the retrieved tuples in the form of a bitstream on the shared distribution medium 42. The filters 43-1, 43-2, . . . , 43-n monitor the shared distribution medium 42 and retrieve each tuple as it is broadcasted. The filters 43-1, 43-2, . . . , 43-n apply predicates and arithmetic functions to the tuples. Thereafter, the filter subsystems 43-1, 43-2, . . . , 43-n transfer tuples which satisfy the query, identifiers to tuples which satisfy the query, or other values via the communication channel 44 to the processor 34. The processor 34 may further process the tuples or values and transmit further instructions for selecting tuples which satisfy the query. The selected tuples form the read-set of the query and are transferred from the processor 34 to the general purpose processor 10 via the bus 18.

According to the Datacycle architecture, the transmitter 41, database memory 32 and processor 34 form a "pump." The purpose of the pump is to cyclically broadcast the database and to maintain, i.e., add tuples to, delete tuples from, or modify tuples in, the database. Each filter subsystem 43-1, 43-2, . . . , 43-n is a type of passive "data access manager." A data access manager receives tuples of a relation and performs selection operations on the tuples to determine if the tuples satisfy received queries.

The broadcast database architecture of FIG. 3 has two significant design criteria. First, the elements which make up the broadcast database system 30 are each highly specialized devices. That is, the pump (i.e., processor 34, memory 32 and transmitter 41, collectively) is specially designed to broadcast relations but cannot execute queries. On the other hand, the data access managers (i.e., the filter subsystems 43-1, 43-2, ..., 43-n) are highly specialized passive "data filters"—they can execute queries against relations but must rely on the pump to broadcast the relations. Such specialization allows each element to be constructed to perform its intended task efficiently. Second, the broadcast database architecture of FIG. 3 employs strict synchronization between query execution in the data access managers and the cyclical broadcast of the tuples by the pump. In other words, the data access managers must complete execution of queries against each received tuple before the next tuple is received from the pump. Stated another way, if the tuples are each sequentially broadcasted in successive fixed length time intervals T, the data access managers must complete execution of the query for each tuple within the time interval T.

However, these design criteria can also be disadvantageous. First, the strict synchronization criterion constrains the per tuple query execution time to be equal to (or less than) the tuple broadcast time. Under strict synchronization, a data access manager can only execute queries which can be completed, for a worst case tuple, before the next tuple is broadcasted.

This "coupling" of query execution time to broadcast time prevents optimization of the query execution, for example, by taking advantage of spare processing time through short-circuit boolean evaluation, or by skipping execution of query instructions which follow a predicate that evaluates false, or both. Short circuit-boolean evaluation increases the speed of predicate evaluation for complex predicates that have multiple conjunctive terms (i.e., predicate terms connected by logical AND) or multiple disjunctive terms (i.e., predicate terms connected by logical OR). Using short-circuit boolean evaluation, it is advantageous to evaluate conjunctive terms in the order of highest selectivity to lowest selectivity. Here, "selectivity" is an inverse measure of the number of tuples, in the particular database against which a conjunctive term is applied, which satisfy that conjunctive term. That is, a first term has a higher selectivity in a particular database than a second term if fewer tuples in that particular database satisfy the first term than satisfy the second term.

For example, consider the following complex query predicate with conjunctive terms:

WHERE (age=15) AND (sex=male) AND (sport=basketball) wherein, against a database of interest, 10% of the tuples satisfy the first term of the predicate (age=15), 50% of the tuples satisfy the second term of the predicate (sex=male) and 0.1% of the tuples satisfy the third term in the predicate (sport=basketball). Advantageously, the third term in the predicate is first executed against each tuple. Then, the first term in the predicate is illustratively executed against only the 0.1% of the tuples that satisfy the third term in the predicate. Finally, the second term in the predicate is only executed against the tuples which satisfy both the first and third terms in the predicate.

The optimization technique, wherein instructions following a complex predicate that evaluates false are not executed, is useful where a query includes one or more predicates followed by a variety of instructions. Such instructions could be complex arithmetic instructions, instructions for selecting a record and transferring attributes thereof, or instructions involved in projection operations, modifications/transformations of the data or hash functions (described in detail below), etc. (Generally speaking, this technique is frequently implemented to save useful query execution time in an environment where such saved time can be used to execute queries against subsequent tuples. However, for reasons discussed below, this technique cannot save such useful query execution time in the prior art broadcast database system 30 of FIG. 3). Initially, only the predicate terms of the complex predicate are executed against attribute information of a tuple. If the tuple has attribute information which satisfies these predicate terms, the more complex and time consuming instructions are executed. On the other hand, if the tuple's attribute information fails to satisfy the initially executed predicate terms, the complex time consuming instructions are not executed. Rather, the query is executed against the attribute information of the next tuple.

For example, consider the query:

SELECT PRODUCT (age, weight) WHERE (age=15) AND (sex=male) AND (sport=basket ball)

wherein the predicate portion (which follows "WHERE") illustratively satisfies 0.05% of the tuples and uses, at most, three broadcast cycles (of the broadcast database system 30 of FIG 3) to execute, and wherein the complex instruction PRODUCT (age, weight) illustratively uses sixteen broadcast cycles to execute. By executing the complex instruction PRODUCT (age, weight) for only those tuples which satisfy the predicate portion of the query, a substantial overall savings in useful query execution time is achieved.

In either optimization technique, the query execution time varies from tuple to tuple. Tuples having attribute information that satisfies the predicate of the query ("interesting tuples") utilize a larger execution time than tuples having attribute information that fails to satisfy the predicates of the query ("uninteresting tuples"). However, the data access managers 43-1 to 43-n of the broadcast database system 30 of FIG. 3 are not capable of executing only part of their instructions in the case attribute information of a particular tuple fails to satisfy a predicate thereof. Rather, due to design constraints in the prior art, the data access managers 43-1 to 43-n must execute all of their instructions for each tuple. Moreover, using an optimization technique such as described above, a complicated query may be devised which has a worst case per tuple execution time that is greater than the per tuple broadcast time but an average execution time which is less than or equal to the broadcast time. Nevertheless, the data access managers 43-1 to 43-n cannot execute such a query if the query cannot be executed against a worst case tuple in a time which is less than or equal to the broadcast time.

Second, the strict specialization of function of the pump 32,34,41 and data access managers 43-1 to 43-n prevents execution of other search optimization strategies which require elements that can perform both functions. For instance, it is often desirable for a data access manager to download a snapshot of the database and to operate on this snapshot independently—in particular, asynchronously with—the broadcast of the relation by the pump.

Often, it is merely desired to create a snapshot which stores a temporary relation created from attribute values selected in executing a query. For example, it may be desirable to execute a subsequent query against the temporary relation. However, in order to (effectively) operate in such a fashion, the data access manager must have some other pump mechanism for storing the snapshot and for broadcasting the snapshot to the data access manager. The broadcast database system 30 cannot perform such operations.

As a practical consideration of these two limitations, consider the execution of join operations. The execution time of join operations using the broadcast database system 30 of FIG. 3 depends on the number of tuples in the joined relations and the number off unique join attribute values. Thus, the per tuple query execution time may be greater than the broadcast time. Furthermore, join operations are often intended to form a resultant joined relation against which another query is to be executed. In order to execute such a query, the resultant joined relation must first be transmitted to the pump 32,34,41 of the broadcast database system 30 and stored thereat. This imposes great delays in the execution of such a query. Furthermore, the memory 32 is of a fixed size and cannot store an arbitrary number of temporary relations that would result from an arbitrary number of join operations, and thus presents an impediment to the scalability of the overall query processing.

It is therefore an object of the present invention to overcome the disadvantages of the prior art.

SUMMARY OF THE INVENTION

These and other objects are achieved according to the present invention which provides a modular broadcast database system architecture. According to one embodiment, a broadcast database system module is provided with a processor and a memory subsystem. The processor and memory subsystem of the broadcast database system module can cooperate to provide al.1 functions of a broadcast database system such as the pump function, data filter function, database mirror function, snapshot function, etc.

In performing the data filter function, the memory subsystem transfers attribute information of broadcasted tuples to the processor and the processor executes queries against the attribute information of tuples. Selected records or projected attributes may then be moved to another portion of the memory subsystem or transferred to another general purpose computer.

In performing the pump function, the memory subsystem broadcasts all or part of a database stored therein. The processor maintains the database stored in the memory subsystem according to instructions to add tuples or attribute information to, delete tuples or attribute information from, or modify attribute information in, the database.

In performing the database mirror function, the memory subsystem stores an up-to-date copy of each tuple broadcasted from an external source. In the event the external source fails, the memory subsystem broadcasts the copy of the tuples stored therein so as to maintain the broadcast of tuples to other broadcast database system modules.

In performing the database snapshot function, the memory subsystem stores an up-to-date copy of each tuple (or a subset of tuples) broadcasted from an external source in much the same way as described for performing the mirror function. However, while performing the snapshot function, the memory subsystem may be updated directly from the broadcast source or alternately may receive tuples via the processor as a result of query execution.

The broadcast database system module can perform several functions at once or alternately perform different functions. For instance, the memory subsystem can simultaneously broadcast tuples to another device and transfer attribute information of the broadcasted tuples to the processor. Meanwhile, the processor can alternately execute queries against the attribute information and maintain the database stored in the memory subsystem as necessary. Alternatively, the memory subsystem can store a snapshot of incoming broadcasted tuples received, for example, from another broadcast database system module. Thereafter, the memory subsystem can transfer attribute information of the snapshot to the processor for query execution.

According to another embodiment, the memory subsystem illustratively transfers the attribute information of broadcasted tuples to the processor in a fashion which decouples the per tuple query execution time by the processor from the per tuple broadcast time. The memory subsystem can achieve the decoupling in a number of ways. For instance, the processor may read out only a part of the attribute information received at the memory subsystem. Thus, the memory subsystem transfers less than all of the attribute information broadcasted for some tuples. Alternatively, the memory subsystem selectively filters out some of the broadcasted attribute information and thus only stores a portion of the broadcasted attribute information therein. In either case, time ordinarily wasted for transferring unused attribute information (i.e., attribute information against which the processor does not execute a query) is conserved. The processor utilizes this extra conserved time for executing its queries against the retrieved attribute information.

According to another query execution method, the tuples are broadcasted in fixed length time intervals T but the processor executes queries against the attribute information of the tuples using variable time intervals. Assume the variable execution time, on average, is less than or equal to the fixed length time intervals T, although it may be longer for some tuples and shorter for other tuples. At times when the processor needs a large amount of time to execute a query against a given tuple, the memory subsystem can buffer the backlogged broadcasted tuples. Later, when the processor needs a small amount of time, the processor can retrieve attribute information of the buffered backlogged tuples. Thus, even though the processor may fall behind the broadcast while executing a query against some tuples, the processor can catch up while executing the query against other tuples.

In short, a broadcast database system module is provided which can perform each broadcast database function and which can decouple the broadcast of tuples from the execution of queries. The broadcast database system module is thus very flexible and can use optimized query execution strategies. Furthermore, several broadcast database system modules can be interconnected to form a single broadcast database system wherein each module performs a specific function, e.g., pump, data filter, database mirror, etc., or alternate functions.

BRIEF DESCRIPTION OF THE DRAWING

FIG. 1 shows two conventional relations.

FIG. 2 shows a relation formed by a join operation executed on the relations A and B.

DETAILED DESCRIPTION OF THE INVENTION

Figure 3:
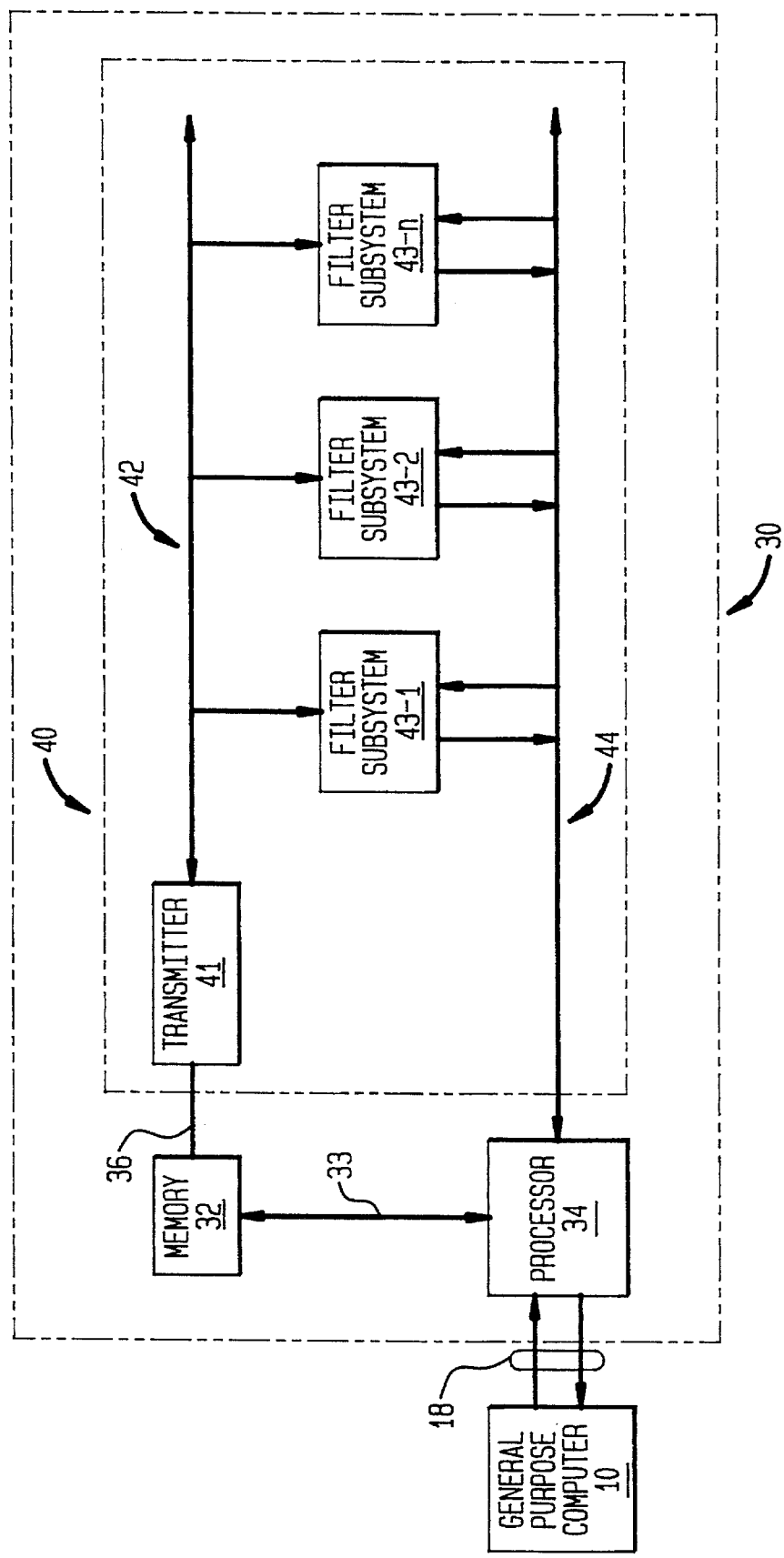
FIG. 3 shows a first broadcast database architecture.
Figure 4:
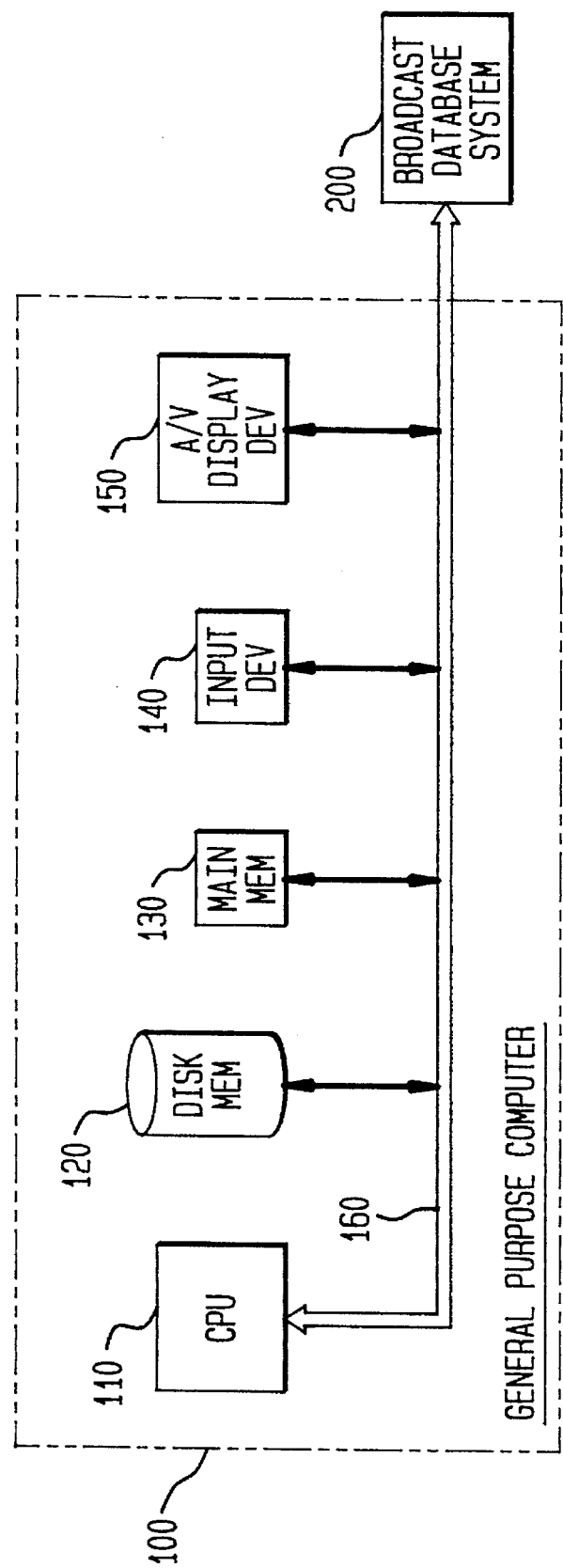
FIG. 4 shows a computer system connected to a broadcast database system according to the present invention.

FIG. 4 shows a general purpose computer 100 connected to a broadcast database system 200 according to the present invention. The general purpose computer 100' includes a CPU or processor 110 for executing commands, and a disk memory 120 and a main memory 130 for storing data and programs. The general purpose computer 100 also includes an input device 140, such as a keyboard or mouse, for receiving data and instructions from a user, and an audio/video display device 150, such a cathode ray tube terminal and speakers, for outputting information to the user. The CPU 110, disk memory 120, main memory 130, input device 140 and audio/video display device 150 are each connected to a bus 160 for communication of data and instructions amongst the CPU 110, disk memory 120, main memory 130, input device 140 and audio/video display device 150.

A broadcast database system 200 comprising at least one broadcast database system module is also connected to the system bus 160. The connection represented by the bus 160 can be implemented in a variety of well known ways that provide communication between the general purpose computer 100 and the broadcast: database system 200. By virtue of this bus 160 connection, the CPU 110 may transfer a write-set containing data to be added to, to be deleted from, or for modifying, existing tuples in the broadcast database system 200. The data of the write-set may originate from the disk memory 120, main memory 130 or input device 140, for example. Furthermore, the CPU 110 may transfer queries to the broadcast database system 200 via the bus 160 for execution thereat. In response, the broadcast database system 200 illustratively returns to the CPU 110 via the bus 160 the read-set containing tuples retrieved by these queries, aggregate values computed by the broadcast database system 200 such as minimums, maximums, averages and sums, or other output from the execution of general query algorithms against the broadcasted database. Attribute information of the tuples of the read-set may thereafter be outputted to the user via the audio/video display device 150.

According to the present invention, the broadcast database system 200 includes one or more broadcast database system modules. The structure of individual modules is first discussed. Then, the operation of a single module and the hierarchical organization of the broadcasted database bitstream are discussed. Thereafter, a broadcast database system architecture with multiple modules is discussed. The possible functions performed by modules in a single and in a multi-module architecture is then discussed. Afterward, advanced features supported by a modular broadcast database system according to the invention is discussed.

I. Broadcast Database System Module Structure

Figure 5:
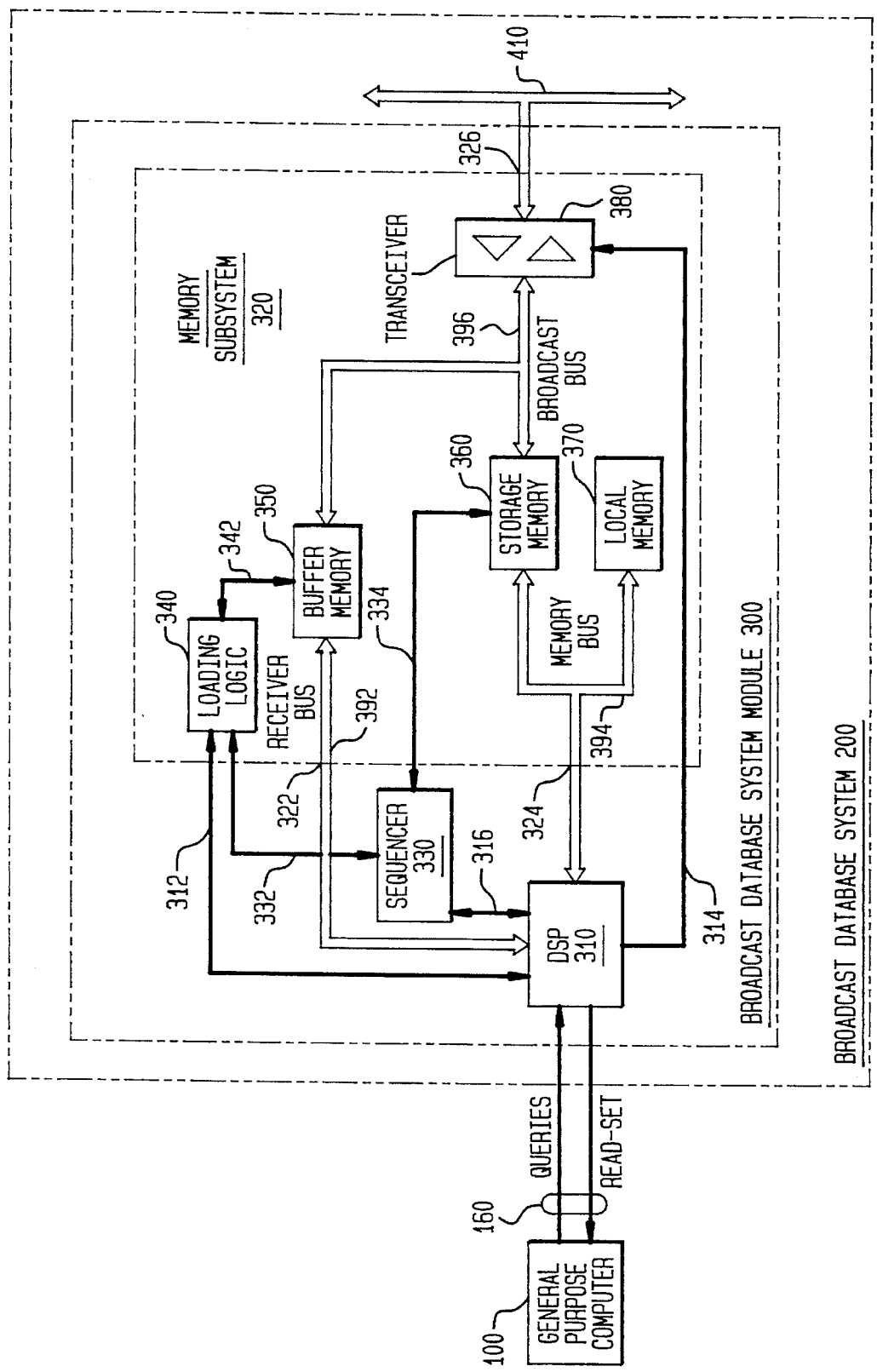
FIG. 5 shows an illustrative broadcast database system module according to the present invention.

FIG. 5 shows a broadcast database system module 300 according to the present invention, which is in the broadcast database system 200. As shown, the broadcast database system module 300 includes a processor 310 such as a digital signal processor (DSP) (hereinafter "DSP"), a memory subsystem 320 connected to the DSP 310, and a sequencer 330. The DSP 310 is capable of executing queries against attribute information of tuples received from the memory subsystem 320. The DSP 310 is also capable of maintaining a database stored in the memory subsystem 320. The memory subsystem 320 is capable of storing a database, broadcasting the stored database (for example, onto a shared distribution medium 410) and receiving tuples of a broadcasted database. As shown, the memory subsystem has three ports 322, 324 and 326. The memory subsystem 320 can transfer tuples to the DSP 310 via the first and second ports 322 and 324. The DSP 310 can also write attribute information to the memory subsystem 320 for storage therein via the second port 324. The memory subsystem 320 can receive externally broadcasted tuples, or broadcast tuples to another device, or both, via the third port 326.

A three ported memory with sufficient size, speed and low cost may not be available which can meet all of the above criterion (and perform all of the below described functions). In such a case, the memory subsystem 320 may be implemented using several commonly available circuits. The memory subsystem 320 may be formed using two dual port memories 350 and 360. The first dual port memory 350 (hereinafter referred to as the "buffer memory") has one of its ports connected via a receiver bus 392 to the first port 322 of the memory subsystem 320. The second port of the buffer memory 350 is connected to a broadcast bus 396. The second dual port memory 360 (hereinafter "storage memory") has one of its ports connected to the broadcast bus 396. The other port of the storage memory 360 is connected via a memory bus 394 to the first port 324 of the memory subsystem 320. Illustratively, another memory 370 (hereinafter the "local memory") is provided which is connected to the memory bus 394.

Advantageously, the buffer memory 350 is a circular buffer which can receive attribute information of tuples from the broadcast bus 396 and allow the DSP 310 to access all or part of the received attribute information via the receiver bus 322. The storage memory 360 is illustratively implemented using a VRAM. In such a case, the random access port of the VRAM storage memory 360 illustratively is connected to the memory bus 394. The serial access port of the VRAM storage memory 360 is connected to the broadcast bus 396. The local memory 370 may be implemented using a high speed SRAM.

The DSP 310 can output instructions to the sequencer 330 for controlling the broadcast and receipt of tuples at the memory subsystem 320. The sequencer 330, in turn, outputs one or more control signals via the connection 334 to the memory subsystem 320. As shown, the control signals outputted by the sequencer 330 illustratively are received at the storage memory 360. The DSP 310 also outputs instructions to the memory subsystem 320 via the connection 312. Illustratively, the instructions conveyed by the connection 312 are received at loading logic 340. In response to these instructions, the loading logic 340 controls the loading of attribute information into the buffer memory 350 via the connection 342. The loading logic 340 illustratively can also measure characteristics pertaining to the receipt of attribute information at, and transfer of attribute information from, the buffer memory 350 (such as fill rate, occupancy, etc.). The loading logic 340 feeds back a control signal via the connection 332 to the sequencer 330, which control signal depends on one or more of these measured characteristics.

Additionally, the DSP 310 outputs control signals to the memory subsystem 320 via the connection 314. The control signals illustratively are received at a transceiver 380. The transceiver 380 is connected to the broadcast bus 396 and the third port 326 of the memory subsystem 320. In response to these signals, the transceiver 380 controls the inputting of attribute information originating from an external source (e.g., via the distribution medium 410). Furthermore, the transceiver 380 also controls the outputting of attribute information from the broadcast database system module 300 in response to these signals.

II. Individual Module Operation

A. Database Storage and Maintenance

As mentioned above, the DSP 310 and memory subsystem 320 can store and maintain a database. For instance, the tuples of a database may be stored in the storage memory 360. The general purpose computer 100 can transmit to the DSP 310 a write-set of tuples and instructions for adding tuples to, deleting tuples from, and modifying tuples in, the database. In response, the DSP 310 writes, via the second port 324, attribute information at addresses of the memory subsystem 320 corresponding to the new or appropriate tuples for purposes of adding to, or modifying, the database. If the addresses are not known, the DSP 310 may illustratively first search the database for the corresponding tuples, as described below, in order to determine the addresses. Illustratively, the storage memory 360 stores attribute information at the designated addresses. Alternatively, all or part of the database may be stored in the local memory 370. However, the storage of the database in the storage memory 360 facilitates the broadcast of the database therefrom (as described below). To delete tuples, the DSP 310 can write other information to the memory subsystem 320 for marking the deleted attribute information as invalid (so that such deleted attribute information is ignored during query execution). Furthermore, the DSP 310 can write information to the memory subsystem 320 indicating that the addresses occupied by the deleted attribute information is free for storage.

B. Storage of other Information by the DSP

The DSP 310 can also store attribute information (e.g., attribute information of tuples to form a joined relation) or other information (e.g., trigger procedure instructions for execution by the DSP 310, vector jump tables, indexing tables, etc.) other than is necessary to maintain the database in the memory subsystem 320 (i.e., the storage memory 360 and local memory 370). For example, in executing a query (as described below), the DSP 310 may search either the buffer memory 350 or the storage memory 360 for certain desired tuples. Then, upon identifying the desired tuples, the DSP 310 may subsequently further process attribute information of the identified tuples, e.g., perform further searching, perform mathematical operations on attribute information of the tuples, etc. The DSP 310 may write attribute information of the initially identified tuples via the second port 324 in the storage memory 360 or local memory 370 (or both). Likewise, the DSP 310 may write instructions (for later retrieval and execution against attribute information of the initially identified tuples) via the second port 324 in the storage memory 360 or local memory 370 (or both). The DSP 310 can then read the initially identified tuples and instructions from the local memory 370 or storage memory 360 via the second port 324 as necessary for performing further processing on the initially identified tuples. Alternatively, the DSP 310 can read the initially identified tuples from the storage memory 360 (assuming the tuples were stored therein) in a fashion as described below).

C. Non-Broadcast Query Execution and Processing

The DSP 310 can access the memory subsystem 320 via the second port 324 for purposes of maintaining the database. However, the DSP 310 can also access the memory subsystem 320 via the second port 324 for purposes of executing queries or performing other attribute information processing. For instance, the general purpose computer 100 can transmit a query to the DSP 310 for execution.. Illustratively, the DSP 310 can access attribute information, or other information used in searching for, and selecting, tuples stored either in the storage memory 360 or the local memory 370.

It is often desirable to use non-broadcast query execution for simple queries when the addresses of the attribute information against which the queries are to be executed are preliminarily known. This is because it is not necessary to wait for the attribute information to be broadcasted; the information can be immediately accessed via the second port 324. However, it is usually desirable to use broadcast query execution for executing queries against large sequential portions of the database. This is because large sequential portions of the database can be retrieved much faster from the first port 322 than from the second port 324.

D. Broadcast Query Execution

In addition to transferring attribute information to the DSP 310 via the second port 324, the memory subsystem 320 can transfer attribute information of cyclically broadcasted tuples to the DSP 310 via the first port 322. This is achieved as follows. As implied by the name of the broadcast bus 396, tuples may be cyclically broadcasted thereon. The broadcasted tuples may be locally broadcasted tuples originating at the memory subsystem 320 itself (in particular, the storage memory 360) or may be externally broadcasted tuples received from the distribution medium 410 via the transceiver 380. Both local and external broadcasts are discussed in greater detail below.

Attribute information of broadcasted tuples which appear on the broadcast bus 396 may be received in the buffer memory 350 under the control of the loading logic 340 (via the connection 342). The DSP 310 can read attribute information of desired tuples from the buffer memory 350 as needed. Illustratively, the DSP 310 transfers via the connection 312 instructions to the loading logic 340 for controlling the loading of tuples or attribute information into the buffer memory 350. In the very least, the loading logic 340 manages the endpoints (head and tail) of the circular buffer memory 350 in response to the DSP 310 reading out attribute information from the buffer memory 350 or the receipt of attribute information at the buffer memory 350. Alternatively, the loading logic 340 is capable of more sophisticated management of the buffer memory 350. For example, the DSP 310 may transfer a command to the loading logic 340 indicating which particular attributes, or, alternatively, which particular tuples, to transfer from the broadcast bus 396 into the buffer memory 350.

The buffer memory 350 can simultaneously store attribute information of broadcasted tuples and transfer stored attribute information to the DSP 310. Moreover, the storage of the attribute information of each tuple by the buffer memory 350 is performed in time intervals which need not be the same length as, nor coincide with, the time intervals in which the buffer memory 350 transfers attribute information for each tuple to the DSP 310. This is discussed in greater detail below.

E. Local Broadcast of Tuples

The memory subsystem 320 illustratively can store a database therein, in the storage memory 360. The memory subsystem 320 broadcasts the database from the storage memory 360 onto the broadcast bus 396 as follows. Initially, the DSP 310 transfers instructions via the connection 316 to the sequencer 330 for controlling the retrieval of the database from the storage memory 360 and the broadcast of the database onto the broadcast bus 396. In response, the sequencer 330 addresses attribute information (e.g., tuples) in the storage memory 360 via the connection 334 and causes the storage memory 360 to broadcast the addressed attribute information onto the broadcast bus 396. The DSP 310 can instruct the sequencer 330 to retrieve attribute information several different ways. For example, the DSP 310 can instruct the sequencer 330 to cyclically address the entire database for sequential broadcast onto the broadcast bus 396. Alternatively, the DSP 310 can instruct the sequencer 330 to address only desired portions of the database. The DSP 310 can also instruct the sequencer 330 to address all or part of the database for broadcast in a non-sequential fashion. For example, the DSP 310 can instruct the sequencer 330 to address frequently accessed portions of the database (called "hot spots") more often than other less frequently accessed portions. Thus, the hot spots will be broadcasted from the storage memory 360 onto the broadcast bus 396 more often than less frequently accessed portions of the database.

As mentioned above, attribute information of the tuples broadcasted onto the broadcast bus 396 can be loaded into the buffer memory 350 under the control of the loading logic 340. The loading logic 340 can measure characteristics pertaining to the receipt of attribute information at, and the transfer of attribute information from, the buffer memory 350. Depending on this measurement, the loading logic 340 can feedback a control signal to the sequencer 330. This control signal may be used for a number of purposes, such as adjusting the broadcast rate in an effort to manage the occupancy of the buffer memory 350. For example, if the buffer memory 350 becomes too full or too empty, the loading logic 340 can transmit a control signal to the sequencer 330 to slow down or speed up the broadcast of attribute information.

The DSP 310 can, but need not, cause the memory subsystem 320 to output the broadcasted database from the third port 326 (for instance, onto the distribution medium 410). To that end, the DSP 310 transmits an appropriate control signal via the connection 314 for causing the transceiver 380 to output the broadcasted database which appears on the broadcast bus 396 via the third port 326.

F. Receipt of Externally Broadcasted Tuples

Figure 7:
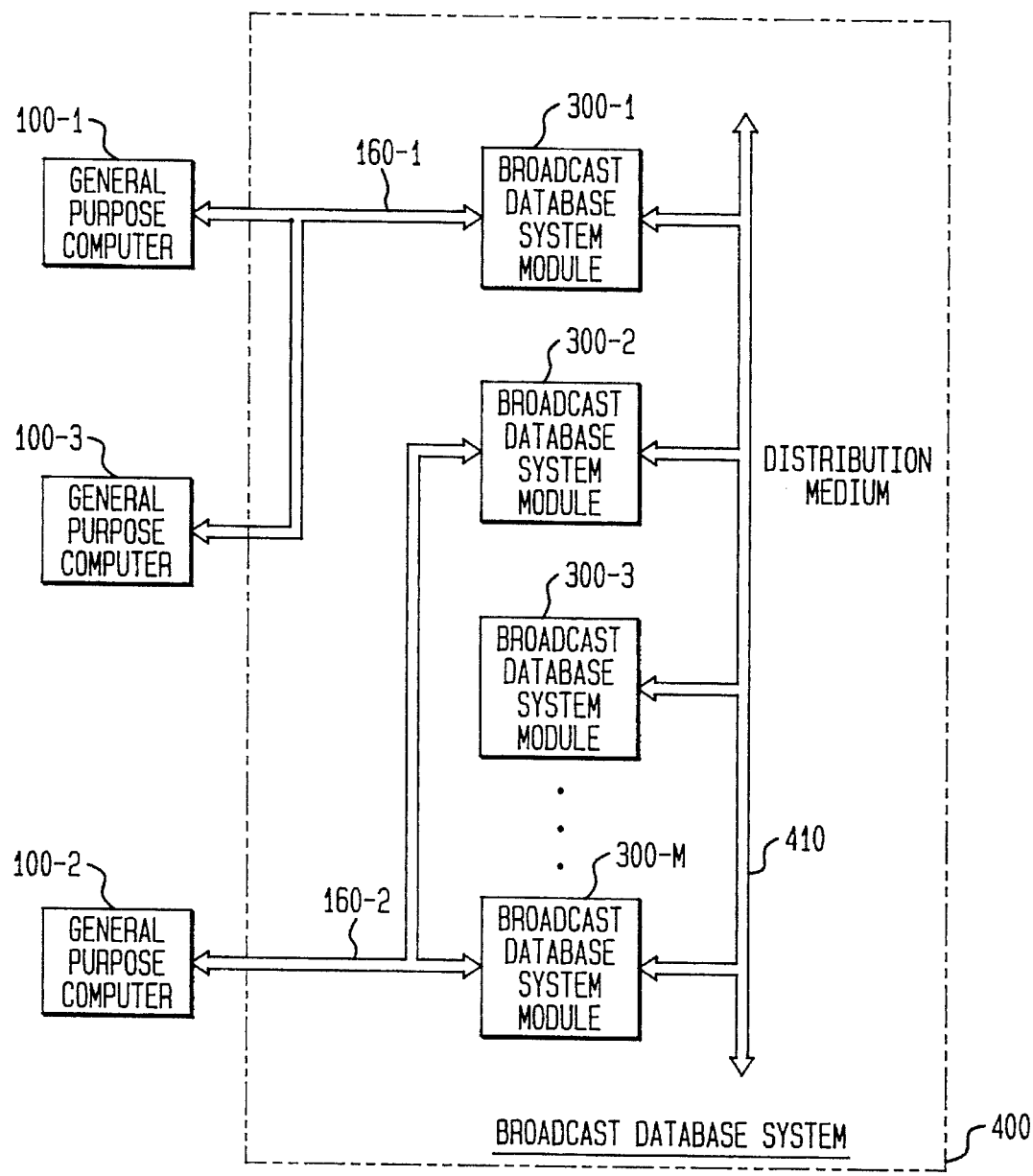
FIG. 7 shows an illustrative interconnection of several broadcast database system modules according to the present invention.

The memory subsystem 320 need not be the source, or the only source, of the database broadcast. Rather another device (e.g., another like broadcast database system module connected as shown in FIG. 7) may broadcast the database to the module 300, for example, via the shared distribution medium 410. The module 300 can selectively enable and disable reception of the externally broadcasted database. This is achieved as follows. When it is desired to receive externally broadcasted tuples, the DSP 310 transmits appropriate control signals via the connection 314 to the transceiver 380 for enabling the receipt of tuples from the distribution medium 410 (via the third port 326) onto the broadcast bus 396. Likewise, the DSP 310 can transmit a control signal via the connection 314 to the transceiver 380 for disabling the receipt of tuples.

The DSP 310 can execute queries against attribute information of tuples which are externally broadcasted to the memory subsystem 320 in this fashion. To that end, the DSP 310 illustratively programs the loading logic 340 with appropriate instructions. The loading logic 340 then manages the loading of attribute information from the broadcast bus 396 into the buffer memory.

In addition, some, all or none of attribute information of the tuples broadcasted onto the broadcast bus 396 from an external source can be directly stored in the storage memory 360 of the memory subsystem 320. This is useful in maintaining an up-to date copy of the database which originates from an external source or for purposes of storing a snapshot.

III. Database Broadcast Bitstream Organization

Illustratively, the database is broadcasted in the form of a bitstream containing the attribute information of the database. The broadcasted bitstream is organized according to a hierarchy.

Figure 6:
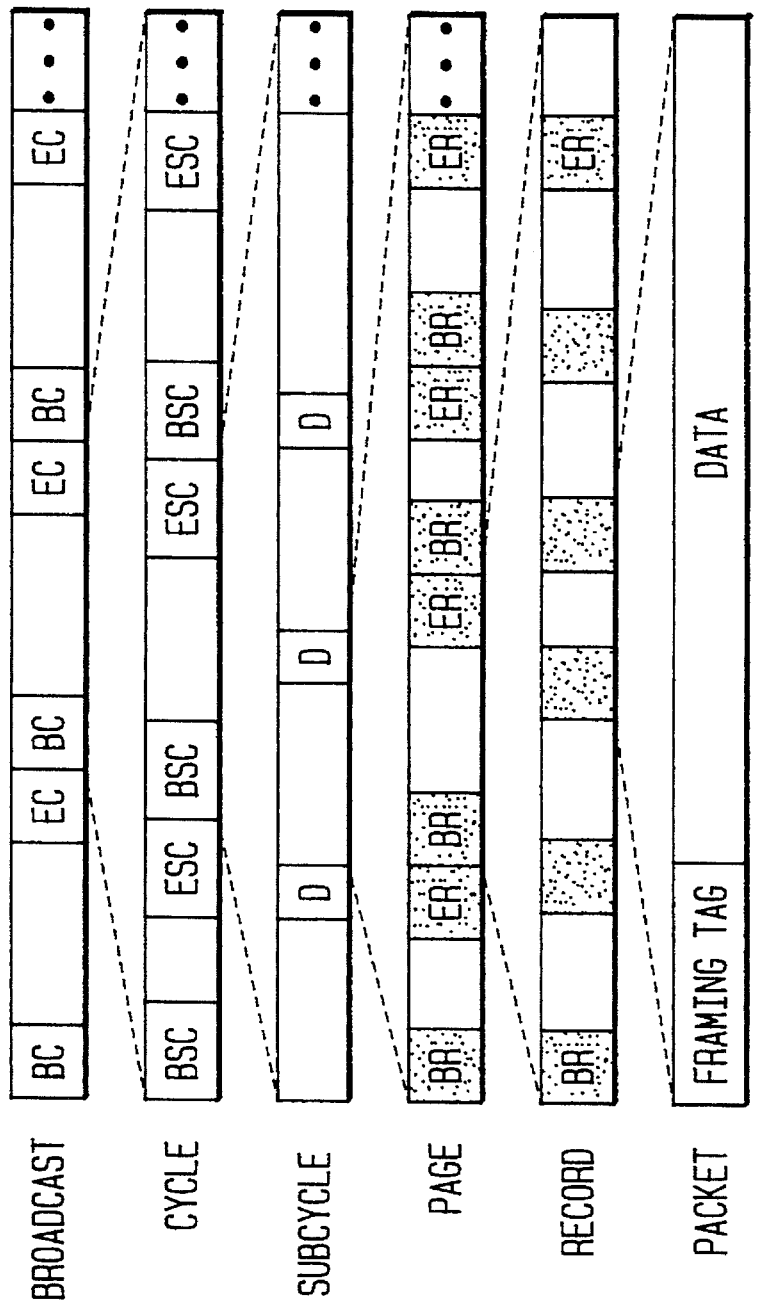
FIG. 6 shows an illustrative bitstream hierarchy for use in the module of FIG. 5.

FIG. 6 shows one such illustrative hierarchy. On the lowest level of the hierarchy are frames. Each frame contains a framing tag and attribute value data. The framing tag is a four byte header which, among other things, identifies the frame's location in the bitstream. (As discussed below, the broadcast bitstream is divided into cycles and subcycles. The header typically contains identifiers for the cycle and subcycle in which it is contained.) The size of the data portion of the frame is illustratively fixed by the DSP 310 as is necessary to broadcast and identify selected tuples.

On the next level of the hierarchy is a record or tuple. Each tuple is preceded by a begin record flag (BR) and ends with an end record flag (ER). The tuple itself includes one or more frames containing attribute values of the tuple. As shown in FIG. 1, the attributes of each tuple are located at fixed offsets within the tuple, defined by the physical schema of the relation.

The next level of the hierarchy is called a page. A page is a fixed unit of memory organization. The page size is fixed on a value which depends on the physical storage of the broadcasted database in the pump. For instance, if the broadcast database system module 300 serves as the database pump, the page size used facilitates retrieval of the database from the storage memory 360. As shown, each page is delimited by a data valid signal (D). Unlike the flags (e.g. ER, BR, etc.) the data valid signal (D) is not embedded within the broadcasted bitstream, but rather, is conveyed via a separate control line on the broadcast bus 410.

Optionally, subcycles may be provided at the next level of the hierarchy. Subcycles comprise a begin subcycle flag (BSC), page data and an end cycle flag (ESC). Subcycles are optional units of database organization which may be used to generate interrupts or identify selections for snapshot loading. The subcycle flags BSC and ESC may be used by the sequencer 330 for synchronizing the storage of data in the storage memory 360 with the received broadcast bitstream. On the highest level of the hierarchy is the cycle. One cycle comprises a begin cycle flag (BC), a complete broadcast of selected tuples in a single selection of tuples, and an end cycle flag (EC). A cycle is often used to demarcate a consistent view of the database. In other words, in some uses of the broadcast database system, updates from a single transaction are guaranteed to be applied atomically, i.e., logically, between broadcast cycles. If it is desired to broadcast every relation stored in the pump then one cycle comprises each tuple of each relation. Cycles can vary in size over time depending on the size of each tuple selection which must be broadcasted at that time.

The hierarchical organization of the bitstream provides several advantages. First, the bitstream can be hierarchically filtered, i.e., selected frames, tuples, subcycles, etc. can be filtered out. This is possible because hardware can be provided which can easily detect the BC, EC, BSC, ESC, BR and ER delimiters, which are bits in the framing tag (and not full 32-bit patterns as in the prior art). Furthermore, the hierarchical organization overcomes a transparency problem, which arises when the aforementioned reserved 32-bit patterns are used in the database (and thus, cannot be used for data).

IV. Multi-Module Broadcast Database System Architectures

The broadcast database system 200 of FIG. 5 can consist of only one broadcast database system module 300. Alternatively, a broadcast database system 400 can be provided which includes several interconnected modules such as is shown in FIG. 7. The broadcast database system 400 shown in FIG. 7, includes M modules 300-1, 300.-2, 300-3, . . . , 300-M, where M≧2. The M modules 300-1 to 300-M are each similar to the module 300 of FIG. 5. Each module 300-1 to 300-M is connected to a distribution medium 410 via the third port 326 (FIG. 5) of its corresponding memory subsystem 320 (FIG. 5). Also shown are three general purpose computers 100-1, 100-2 and 3.00-3 similar to the general purpose computer 100 of FIG 4. The general purpose computers 100-1 and 100-2 are shown connected to the broadcast database system module 300-1, via the bus 160-1 and the general purpose computer 100-2 is shown connected to the broadcast database system modules 300-2 and 300-M via the bus 160-2. This is merely illustrative, however. Any number of the modules 300-1 to 300-M may be connected to a single or separate general purpose computers.

Each of the modules 300-1 to 300-M can operate as described above. Furthermore, each module 300-1 to 300-M can perform one specific function, i.e., the pump function, the data access manager function, the mirror function, the snapshot function, etc., as described below. Alternatively, each database module can perform alternate functions.

The multi-module broadcast database system 400 provides some advantages over the single module broadcast database system 200. In particular, different functions and operations can be distributed over more than one of the modules 300-1, 300-2, . . . , 300-M. For example, the multi-module broadcast database system 400 has a larger overall storage capacity (assuming that the memory subsystem 320 (FIG. 5) of each module 300-1, 300-2, . . . , 300-M is the same size). More than one module can be allocated as described below for maintaining and broadcasting a large database that would be otherwise too big to fit in the memory subsystem of any single module. Likewise, more than one broadcast database system module 300-1 to 300-M can simultaneously execute queries against a single broadcast of the database. Alternatively, the modules 300-1 to 300-M can alternately receive externally broadcasted attribute information at some times and operate only on attribute information locally stored in that specific module at other times.

Consider as a practical example, a database system 400 which forms part of a switched ATM network, wherein the distribution medium 410 is carried by the switched ATM. Suppose each module 300-1 to 300-M is located at an individual site of the ATM network. Furthermore, assume each module 300-1 to 300-M stores a portion of a database sufficient for processing queries pertaining to the site at which the module 300-1 to 300-M is located. Usually, each module 300-1 to 300-M operates in local mode, wherein each module executes queries against only attribute information stored thereat. Occasionally, the modules 300-1 to 300-M can execute queries against attribute information broadcasted thereto from remote modules 300-1 to 300-M via the shared distribution medium 410.

Consider a second example wherein the broadcast database system 400 forms part of a cable television transmission network. Suppose each home has a cable television decoder which is connected to one broadcast database system module, e.g., the module 300-1. (The decoder and television set could therefore serve as a general purpose computer 100 (FIG. 4)). In such a case, the shared distribution medium 410 may be carried by the same network which carries the cable television signal. A pump module, e.g., the module 300-M, could broadcast to each broadcast database system module, e.g., the module 300-1, a catalog of merchandise database which database may include, a description of the merchandise, a picture of the merchandise, price information, etc. A user could then enter queries by entering appropriate keystrokes on the decoder for selecting all or part of the received database. The module 300-1 receives the queries from the decoder which are executed on the attribute information received at the module 300-1. Furthermore, the user could enter queries for purchasing merchandise by entering appropriate keystrokes. In response, the broadcast database system module 300-1 selects attribute information for identifying the purchased item and forwards the information to another module, e.g., the module 300-M, which specifically receives and processes purchase orders.

V. Broadcast Database System Functions

A. Database Pump Function

A database pump stores and maintains a database. The database pump also broadcasts the database. The broadcast database system module 300 can achieve all of these functions as described above.

The broadcast database system module 300 is capable of broadcasting all or part of the database locally, or externally, or both. That is, the memory subsystem 320 can broadcast the database only to the DSP 310 (via the broadcast bus 396, buffer memory 350, and first port 324), only to another device (via the broadcast bus 396, transceiver 380 and distribution medium 410) or both.

If a multiple module broadcast database system 400 (FIG. 7) is provided, one module, e.g., the module 300-2, may serve as the primary pump. The module 300-2 may perform only the pump function or may simultaneously act as the pump and a data access manager (as discussed below). Alternatively, several modules (e.g., the modules 300-2 and 300-M) act as the primary pump. This particular manner of operating the modules 300-1 to 300-M is particularly desirable if the database is too large to be practically stored in any single module 300. In such a case, the database is divided amongst the pump modules 300-2 and 300-M which store and maintain their respective portions of the database. According to one broadcast scheme, each pump module 300-2 and 300-M broadcasts its respective portion of the database over the distribution medium 410 separately from the other pump modules, e.g., in a round robin fashion. According to another broadcast scheme, the pump modules 300-2 and 300-M broadcast their respective portions of the database over the distribution medium 410 in parallel.

B. Data Access Manager Function

A data access manager executes queries against attribute information of the database. In the course of executing queries, the data access manager may search to identify selected tuples and then further process the attribute information of the selected tuples. For example, a query may be executed on the relation B of FIG. 1 which identifies each grade for certain social security numbers and then calculates a grade point average for each social security number. The DSP 310 and memory subsystem 320 are particularly suited to execute such queries.

The DSP 310 can execute queries on the fly (in real time) against the attribute information of broadcasted tuples (which are either broadcasted by, or broadcasted to, the memory subsystem 320). The memory subsystem 320 can also store a snapshot of all or part of the broadcasted database (as discussed below) so that the DSP 310 can process the snapshot (either via the first port 322 or the second port 324 of the memory subsystem 320) independently of the broadcast. If necessary, the DSP 310 can also temporarily store partial results, query portions or selected tuples in the memory subsystem 320.

C. Database Snapshot Function

The broadcast database system module 300 can also store a snapshot of all or part of the attribute information of particular broadcasted tuples. The broadcasted tuples may originate from an external source, i.e., the distribution medium, or from the memory subsystem 320, itself. The creation of a snapshot from locally broadcasted tuples is achieved as follows. The DSP 310 receives attribute information of the tuples via the first port 322 of the memory subsystem (i.e., from the buffer memory 350 as described above). The DSP 310 then writes the desired attribute information in the memory subsystem 320 via the second port 324. This attribute information forms the snapshot and may be stored in either the storage memory 360 or local memory 370.

The creation of a snapshot from externally broadcasted tuples (i.e., tuples broadcasted via the distribution medium 410 and onto the broadcast bus 396) can be achieved in a number of ways. For instance, the DSP 310 can program the sequencer 330 with appropriate instructions for causing the storage memory 360 to store attribute information of the tuples which appear on the broadcast bus 396. The sequencer 330, in turn, outputs appropriate addresses and control signals via the connection 334 for storing in the storage memory 360 the attribute information of tuples broadcasted onto the broadcast bus 396 from an external source. Alternatively, the DSP 310 can receive attribute information of the externally broadcasted tuples from the buffer memory 350. The DSP 310 can then store all or part of this attribute information in the storage memory 360, or local memory 370, or both, via the memory bus 394 in the above-described fashion. This latter storage method enables the DSP 310 (or loading logic 340, or both) to pre-filter the broadcasted tuples and store only selected attribute information of selected tuples.

Once the snapshot is stored in the memory subsystem 320, the broadcast database system module can, for instance, perform local processing on the snapshot. This may be desired if the execution of queries against the snapshot requires a different per tuple query execution time than the per tuple broadcast time. Alternatively, a snapshot may be continuously stored for purposes of carrying out the database mirror function (described below).

D. Database Mirror Function

A database mirror maintains an accurate up-to-date copy of the database broadcasted externally from a primary pump. The database mirror has a mechanism for detecting if the primary pump fails. In the event of a failure, the database mirror takes over the function of the primary pump by broadcasting the copy of the database maintained in the database mirror.

One way to operate the broadcast database system module 300 as a database mirror is as follows. The DSP 310 transfers instructions to the sequencer 330 for causing the sequencer 330 to continuously store in the memory subsystem 320 a copy of the broadcasted database (in a fashion similar to as described above for the snapshot function). The DSP 310 also transmits a control signal via the connection 314 (to the transceiver 380) for causing the memory subsystem 320 to receive the tuples broadcasted on the distribution medium 410. As a result, the database bitstream broadcasted on the distribution medium 410 is received via the third port 326 onto the broadcast bus 396. The storage memory 360 continually stores a copy of the database each time it is broadcasted. Thus, the storage memory 360 has an up-to-date copy of the database broadcasted by the primary pump.

The broadcasted database is also received at the buffer memory 350. The loading logic 340 continuously monitors the receipt of the database information via the connection 342. In the event the primary pump fails, no database information will be received on the broadcast bus 396. This is detected by the loading logic 340 which transmits a signal indicating this event to the sequencer 330 via the connection 332. In response, the sequencer 330 causes the storage memory 360 to broadcast the copy of the database stored therein onto the broadcast bus 396. Furthermore, the failure of the primary pump is detected by the DSP 310 for example, using a time-out mechanism. In such a case, the DSP 310 transmits an appropriate signal via the connection 314 for causing the transceiver 380 to output the broadcasted database from the broadcast bus 396 to the distribution medium 410.

If the primary pump fails in the middle of a broadcast cycle, the copy of the database of the current cycle which is contemporaneously stored in the mirror may be incomplete and therefore invalid. To ensure the consistency of the database, the memory subsystem 320 of the mirror illustratively maintains a full copy of the database broadcasted during the previous cycle while storing an updated copy of the database of the current broadcast cycle. If the primary pump fails in the middle of the current cycle, the mirror broadcasts the copy of the database of the previous cycle. Alternatively, two broadcast database system modules store the broadcasted database on alternate cycles in a round-robin fashion. If the primary pump fails, then the broadcast database system module which stores the most recent and complete, valid copy of the database replaces the primary pump by broadcasting its copy of the database.

VI. Advanced Data Features

In addition to performing the above-noted broadcast database system functions, the broadcast database system module 300 supports certain advanced features. Some of these advanced features are considered below.

A. Broadcast Time and per Tuple Query Execution Time Decoupling

According to the broadcast paradigm, tuples are broadcasted using a constant time. For example, a pump may cyclically broadcast the tuples of a database to the data access managers one tuple every fixed length time interval T. However, one or more data access managers may desire to execute complex queries which have a longer per tuple execution time (i.e., queries which require more than the interval T to execute per tuple). Alternatively, the data access managers may desire to execute queries having a variable per tuple execution time, wherein the variable time is greater than the fixed length time interval T for a worst case tuple but is less than or equal to T on average. (Two examples of variable time query execution schemes are described above, namely, short-circuit boolean evaluation and not executing the complex instruction portions of a query if the attribute information of a tuple fails to satisfy the predicate portion of the query.) In any of these cases, the broadcast database system module 300 performing the data access manager function must decouple the per tuple query execution time from the broadcast time. The broadcast database system module 300 can achieve this in a number of ways which are described below.

1. Selective Filtering by Loading Logic

According to a first rate decoupling scheme, the DSP 310 programs the loading logic 340 to filter out certain attribute information or tuples broadcasted on the broadcast bus 396. For instance, certain attributes or even selected tuples may be filtered out of the broadcast stream. Thus, not all of the attribute information broadcasted onto the broadcast bus 396 is received at the buffer memory 350. The DSP 310 then retrieves, and executes queries against, only the attribute information in the buffer memory 350. On the other hand, part of the broadcast time is utilized to broadcast the information which is filtered out by the loading logic 340. This portion of the time is conserved and may be used by the DSP 310 to extend the maximum per tuple query execution time.

In addition, the pre-filtering by the loading logic may produce other, albeit, less significant, time savings. In the case that the loading logic pre-filters out undesired tuples, the time which otherwise would be used by the DSP 310 for performing this task is conserved. Other per tuple overhead query execution time of the DSP 310 (i.e., loop overhead time, attribute information transfer time from the buffer memory 350 to the DSP 310, etc.) is furthermore conserved since such undesired tuples are not processed by the DSP 310. Likewise an even smaller amount may be saved by pre-filtering out undesired attribute values (which would otherwise have to be skipped by the DSP 310).

2. Selective Retrieval Of Attribute Information by DSP

According to this second rate decoupling scheme, not all attribute values stored in the buffer memory 350 are retrieved by the DSP 310 (or even stored in the buffer memory 350). Rather, only the attribute values against which the DSP 310 executes the query are retrieved by the DSP 310. On the other hand, the broadcasted tuples typically include all attribute values of each tuple. Again, the time utilized to broadcast the unused information is conserved, thereby permitting the DSP 310 to utilize more time to execute its queries. (However, such savings may be smaller than other time query conservation methods mentioned in this section.)

3. Variable Query Execution Time

Consider a scenario where the DSP 310 uses a variable time execution paradigm (e.g., short-circuit boolean evaluation, instruction skipping on predicate failure). In such a case, the per tuple query execution time varies from tuple to tuple. However, the broadcast of tuples utilizes an unvarying, fixed length time interval T for each tuple. The buffer memory 350 receives, and temporarily stores, attribute information of each broadcasted tuple using the unvarying fixed length time T. However, the attribute information of each tuple need not be outputted to the DSP 310 in fixed length intervals of time T. Rather, the buffer memory 350 only outputs attribute information as needed by the DSP 310. At times, the DSP 310 may process tuples more slowly than the buffer memory 350 stores tuples. During such times, the occupancy of the buffer memory 350 increases. At other times, the DSP 310 may process tuples faster than the buffer memory 350 stores tuples. During such other times, the occupancy of the buffer memory 350 decreases. In short, the DSP 310 may fall behind the broadcast while executing queries against the attribute information of some tuples. However, the buffer memory 350 simply stores the attribute information of the backlogged tuples which are broadcasted during such times. Later, the DSP 310 can catch up while executing the queries against the attribute information of the backlogged tuples.

B. Query Execution Using Hash Partitioning

In general, the number of queries that can be concurrently executed in the DSP 310 depends on the sum of the average execution times of each query. The queries are executed serially against each tuple received into the buffer memory 350 from the broadcast bus 396. Thus, the sum of the average execution times of each query must be less than the per tuple broadcast time. However, with many classes of queries, a prior knowledge of query characteristics allows concurrent execution of the queries in a much more efficient manner, for example, through the use of hash partitioning.

A hashing function is a function which is defined over the domain of a particular attribute and which maps each value of the particular attribute to a non-unique hash value. Using hash-partitioning, large numbers of queries that search for one particular attribute value of a tuple (called the key attribute) can be concurrently executed by the DSP 310. Specifically, the set of queries to be concurrently executed is partitioned into subsets wherein all queries of a given subset search for key attribute values which hash to the same hash value. Subsequently, for each tuple in the database, the key attribute value is hashed and only the subset of queries corresponding to the hashed key attribute value need be searched.

Figure 8:
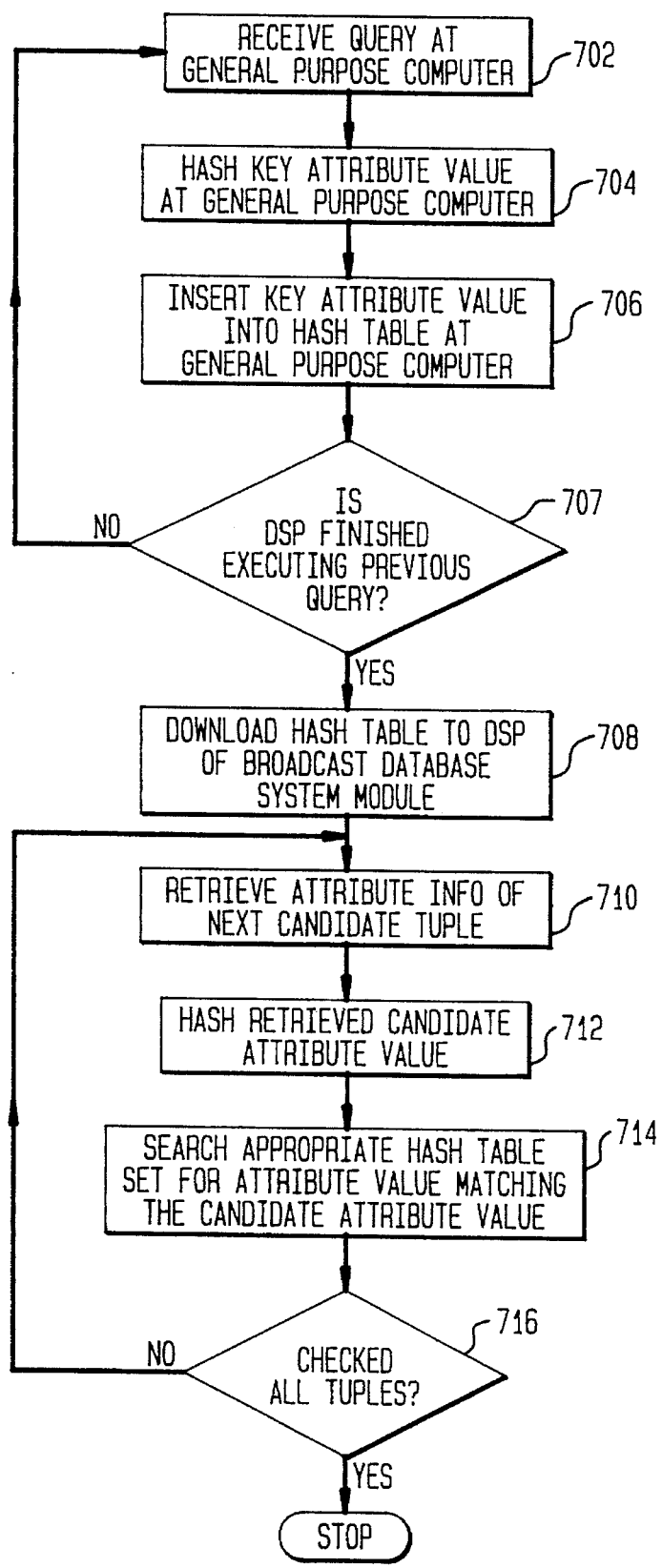
FIG. 8 is a flowchart which schematically illustrates a hashing technique for executing queries.

FIG. 8 is a flowchart of a hash partitioning process executed by the broadcast database system module 300 (FIG. 5) in evaluating queries. For each query received by the general purpose computer 100, steps 702, 704 and 706 are executed. In step 702, the general purpose computer 100 receives a query indicating tuples to be identified which have a particular key attribute value. In step 704, the general purpose computer 100 hashes the key attribute value. In step 706, the general purpose processor 100 inserts the hashed key attribute value into a hash table. The hash table entries are grouped into sets according to their corresponding hashed value. Advantageously, the hash table entries of each set are sorted on the attribute values contained therein. In step 707, execution branches back to 702 while a previous query is executing, thereby permitting additional queries to be simultaneously processed and also ensuring that new queries do not disrupt execution of a previously submitted query. When the previous query finishes executing in the broadcast database system module 300, step 707 permits the DSP 310 to execute step 708. In step 708, this hash table is down loaded to the DSP 310 via the bus 160. The DSP 310 may then store the hash table in the memory subsystem 320 (e.g., in the local memory 370). This hash table serves as the query to be executed by the DSP 310.

Next in step 710, the DSP 310 retrieves attribute information for a candidate tuple (according to one of the above-described manners) which the DSP 310 has not yet examined. In step 712, the DSP 310 then hashes this candidate attribute value using the same hashing function used by the general purpose computer 100. (Alternatively, the hashed value of this candidate attribute value may be predetermined and stored in each tuple. In such a case, the DSP 310 also retrieves the hashed value of the candidate attribute value in step 710 and does not execute step 712).

In step 714, the DSP 310 determines if the candidate attribute value matches a key attribute value of the query. To that end, the DSP 310 searches the hash table entries of the set corresponding to the hashed value of the candidate attribute value. If a hash table entry of this set exists which contains an attribute value matching the candidate attribute value, then the candidate tuple satisfies the query. Otherwise, the candidate tuple does not satisfy the query. The DSP 310 then executes step 716 which causes execution to branch back to step 710 if all of the candidate tuples of the database have not yet been checked.

This process is now described using credit card validation as an example. For instance, the general purpose computer 100 may be an automated teller machine which receives credit card numbers and user entered security codes. As each credit card number arrives at the general purpose computer 100, steps 702, 704 and 706 are executed. In step 702, the general purpose computer 100 receives a query indicating tuples to be identified which have a particular key attribute value. In step 704, the general purpose computer 100 hashes the credit card number. In step 706, the general purpose processor 100 inserts the hashed credit card numbers into the hash table. The hash table entries are grouped into sets according to their corresponding hashed value. Step 707 causes steps 702–706 to be repeated until the previously submitted queries finish execution. In step 708, the general purpose computer downloads the table to the DSP 310 of a broadcast database system module 300 which verifies the security codes. The DSP 310 illustratively stores the hash table in the memory subsystem 320 of the module 300.

Next, in step 710, the DSP 310 reads from the memory subsystem 320 the credit card number attribute value contained in a candidate tuple which has not yet been checked. In step 712, the DSP 310 then hashes the credit card number of the candidate tuple (or, alternatively, simply retrieves the predetermined hashed credit card number attribute value contained in the candidate tuple.) The DSP 310 then executes step 714. In step 714, the DSP 310 searches the set of hash table entries associated with the hashed candidate credit card number for a credit card number which matches the candidate credit card number. If a match occurs, the DSP 310 can, for instance, retrieve the security code of the matching candidate tuple from the memory subsystem 320 and place the security code in a read-set. The DSP 310 then executes step 716 which causes the DSP_310 to branch back to step 710 if all of the candidate tuples have not yet been checked (or until all tuples to be identified have been identified, whichever occurs first).

C. Database Triggers

One or more database triggers may be supported by the broadcast database system module 300 in the following fashion. To determine whether or not to execute each trigger, the DSP 310 utilizes a jump vector table which is indexed by hashed key attribute values. For example, consider a relation containing stock identifier and price attributes. Triggers may be implemented for buying or selling particular stocks when the prices of the stocks reach particular thresholds. In such a case, the stock identifiers of the stocks are the key attribute values which are hashed. The DSP 310 constructs a vector jump table including one vector jump table entry for each trigger. Each entry includes the hashed key attribute value corresponding to the trigger and a memory address in the memory subsystem 320 of the trigger program which the DSP 310 executes upon reading an appropriate key attribute value. For example, if a trigger is to be implemented to buy stock K at a certain price, an entry is provided in the vector jump table including the hashed value of the identifier K and a memory address of the trigger program for determining whether or not to buy stock K. The trigger procedures themselves may be stored in the memory subsystem 320 (e.g., in the local memory 370). The DSP 310 may also store the vector jump table thus constructed in the memory subsystem 320.

The DSP 310 reads the attribute information of the database (according to one of the above-described manners) which can cause the execution of the trigger procedures from the memory subsystem 320. In particular, the DSP 310 reads candidate hashed attribute values of the key attributes (which can cause the execution of trigger procedures). (If the hashed attribute values have not been predetermined and stored in the database, the DSP 310 reads each candidate attribute value of each key attribute and hashes the candidate attribute on the fly.) For instance, in the stock trigger program, the DSP 310 reads each hashed stock identifier in the database. The DSP 310 compares each candidate hashed attribute value to the hashed attribute values contained in the vector jump table entries. If a match occurs, the DSP 310 utilizes the corresponding memory address of the matching table entry to execute the appropriate trigger program.

In executing the trigger program, the DSP 310, first compares the non-hashed version of the candidate attribute value with the attribute value which triggers the execution of the particular trigger procedure. For instance, the DSP 310 compares the non-hashed stock identifier (read from the memory subsystem 320) to the stock identifier for which a buy or sell instruction has been placed. If they do not match, the DSP 310 ceases executing the trigger program. If the attribute values match, the DSP 310 continues execution of the trigger program. The execution of the trigger procedure can cause the DSP 310 to generate messages, change attribute values of tuples, retrieve attribute values of tuples, etc. In the stock trigger example, the trigger program may cause the DSP 310 to read the price attribute value of a particular stock and issue a buy or sell order if the price attribute value is above or below particular thresholds. After executing the trigger procedure, the DSP 310 resumes retrieving key attribute information from the memory subsystem 320 and executing trigger procedures if the hashed retrieve attribute information matches a jump vector table entry.

D. Natural Joins

Figure 9:
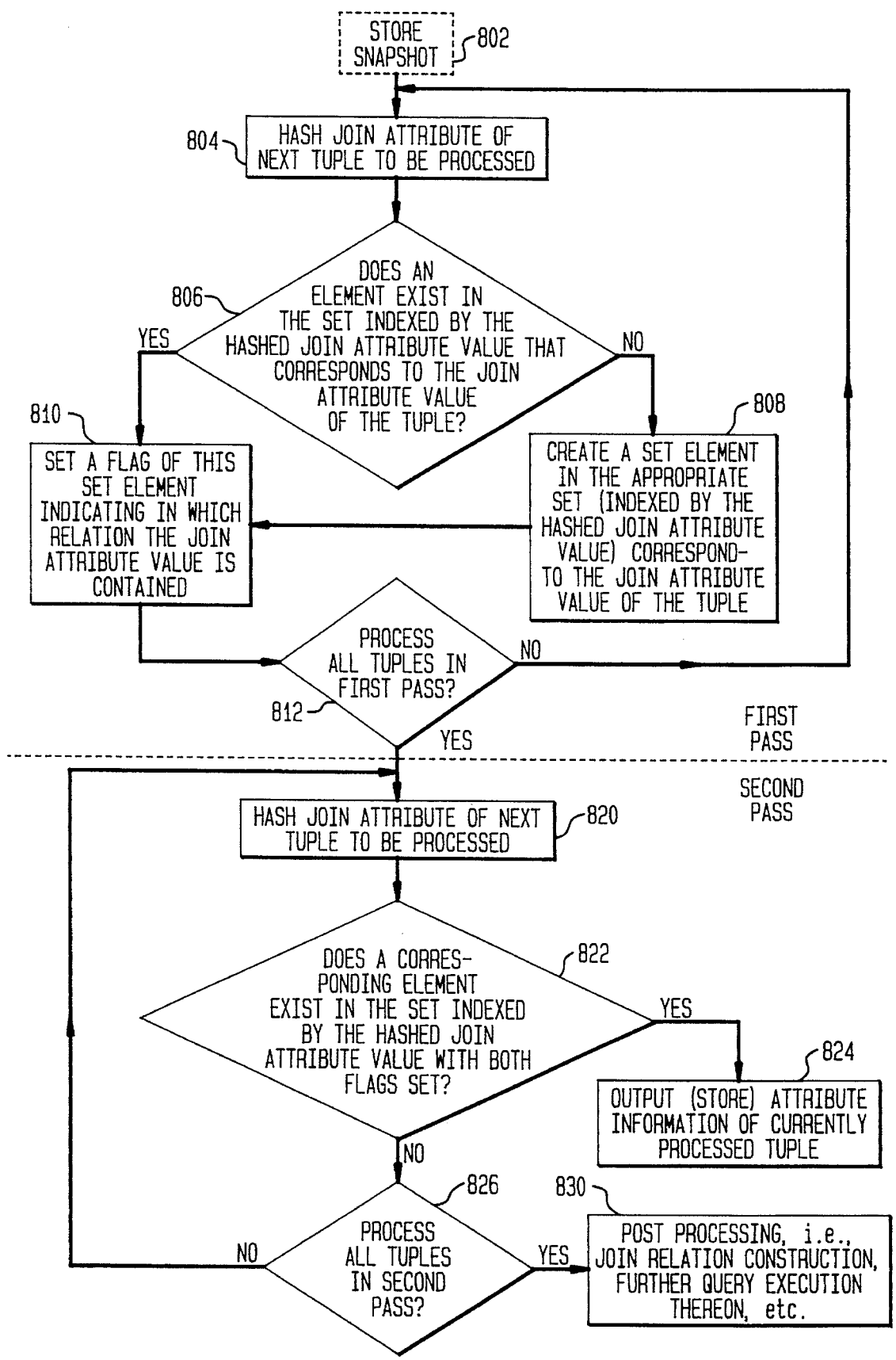
FIG. 9 is a flow chart which schematically illustrates a hashing technique for executing join operations.

The execution of joins using hashing functions in a relational database environment is disclosed in P. MISHRA & M. EICH, "JOIN Processing in Relational Databases" ACM COMPUTING SURVEYS, vol. 24, no. 1, Mar., 1992, p. 63–113. The broadcast database system module 300 advantageously executes a two pass hashed join process which is illustrated in FIG. 9. The join process is illustrated for joining two relations, although the discussion could be easily extended to joins on more than two relations.

In step 802, the broadcast database system module 300 stores a snapshot of the relations to be joined in the memory subsystem 320, if necessary (for instance, to decouple the per tuple broadcast time from the per tuple join execution time). Next, the DSP 310 executes steps 804–812 of the first pass for each tuple of the relations to be joined. In so doing, the DSP 310 successively retrieves attribute information of each tuple of the relations to be joined from the memory subsystem 320 according to one of the above-described manners. During the first pass, the DSP 310 constructs a group of hash-partitioned sets. This group of sets contains elements which indicate if a particular attribute value is contained in both relations to be joined.

In step 804, the DSP 310 retrieves the join attribute of the next tuple to be processed and hashes it. Alternatively, the hashed version of the join attribute value may be predetermined for each tuple and stored in the database. In such a case, the DSP 310 simply retrieves the join attribute value and the hashed version of the join attribute value of the next tuple to be processed. The DSP 310 then places the retrieved join attribute value into a set corresponding to its hashed value along with an identifier to the tuple to which it corresponds. Advantageously, the elements of each set are sorted according to their respective join attribute values.

In step 806, the DSP 310 determines if there exists an element in the set indexed by the hashed join attribute value which corresponds to the join attribute value of the tuple currently processed by the DSP 310. In so doing, the DSP 310 examines the set elements of the set indexed by the hashed join attribute value of the currently processed tuple. If no such set element exists, the DSP 310 first executes step 808. In step 808, the DSP 310 creates an element for storage in the appropriate set of the group of sets (i.e., the set indexed by the hashed join attribute value of the currently processed tuple) which contains the join attribute value of the currently processed tuple. Then step 810 is executed.

Step 810 may be executed immediately after step 806 or after step 808. In step 810, the DSP 310 updates the set elements to keep track of the join attribute value of the currently processed tuple. This is achieved as follows. The DSP 310 sets a flag of the set element corresponding to the join attribute value of the currently processed tuple which flag is associated with the relation of the currently processed tuple. Illustratively, each set element has one flag corresponding to each of the two join relations. Thus, each set element indicates whether the corresponding join attribute value was encountered in none, one or both relations to be joined, depending on whether none, one or both of the flags are set.

In step 812, the DSP 310 determines if each tuple of the relations Co be joined have been processed in the first pass. If not, execution proceeds to step 804. Thus, steps 804–810 are executed for each tuple of each of the relations to be joined.

Next, the DSP 310 processes each tuple during a second pass which includes steps 820–826. Again, the DSP 310 successively retrieves attribute information for each tuple of the relations to be joined from the memory subsystem 320 according to one of the above-described manners. In step 820, the DSP 310 successively retrieves the join attribute value of the next tuple and hashes it (or, alternatively, the DSP 310 retrieves the predetermined hashed join attribute value already contained in the database). Next in step 822, the DSP 310 examines the flags of the set element corresponding to the join attribute value of the currently processed tuple. If these flags indicate that both relations to be joined contain this join attribute value, the DSP 310 executes step 824. In step 824, the DSP 310 outputs or stores attribute information of the currently processed tuple for later use. Execution then proceeds to step 826.

If the set element does not indicate that each relation to be joined contains this attribute value, then execution proceeds directly to step 826. In step 826, the DSP 310 determines if all of the tuples of each relation to be joined have been processed during the second pass. If not, execution proceeds to step 820. Thus, steps 820–826 are repeated for each element of each relation to be joined.

Finally, post-processing is performed in step 830. For example, the DSP 310 may transmit a read-set containing the stored or outputted attribute information of the tuples which form the joined relation to the general purpose computer 100. Thereat, the general purpose computer 100 constructs the resultant joined relation from the outputted attribute information. Alternatively, the DSP 310 constructs the resultant joined relation. This may be advantageous if the DSP 310 must execute additional queries against the resultant joined relation. In such a case, the DSP 310 may store the resultant joined relation in the memory subsystem 320.

In an enhancement to the join process of FIG. 9, the DSP 310 illustratively compacts the group of sets between the first and second passes (i.e., between steps 812 and 820). In the compaction step, the DSP 310 discards set elements of the group whose flags do not indicate that both of the relations to be joined possess the corresponding join attribute value. If such a compaction step is utilized, then in step 822 the DSP 310 can simply determine whether or not the group of sets contains a set element corresponding to the join attribute value of the currently processed tuple. By implication, such a set element must have flags indicating that the join attribute value is contained in both relations to be joined.

In the event that the relations to be joined are very large, the required memory for efficiently performing the hash-partitioning may exceed the storage capacity of the memory subsystem 320. That is, the efficiency of the hash-partitioning can be increased by selecting a hashing function which increases the number of generated hashing sets. However, the number of permissible hashing sets is limited by the storage capacity of the memory subsystem 320. Additionally, larger relations may have an undesirably high number of tuples which require a long query execution time. In either case, the average time required by the DSP_310 to process attribute information in the first and second passes may be undesirably high. In such a case, the database is advantageously divided for processing in a number of successive join operations. This can be achieved as follows. Suppose the hashing function is designed to produce one of m·N values. The process of FIG. 9 is successively executed m times. During a first iteration, the DSP 310 only fully executes the first and second pass (i.e., only executes steps 806, 808, 822 and 824) for tuples whose hashed join attribute value is one of the first 1 to N values. The hashed join attribute values N+1 to m·N are simply ignored. Likewise, during the second iteration, the DSP 310 only fully processes (i.e., only executes steps 806, 808, 822 and 824 for) tuples whose hashed join attribute values are one of the second N+1 to 2·N values, and so on.

In a multi-module topology 400, it is also possible for more than one of the modules 300-1, 300-2, 300-3, ..., 300-M acting as a data access manager to execute the join process of FIG. 9 in concert. In such a case, each of the modules, e.g., 300-1, 300-2 and 300-3 acting as a data access manager is assigned a portion of the relations to be joined. Each module 300-1 to 300-M only applies the process of FIG. 9 to the portion of the relations assigned thereto. After executing the first pass, the modules 300-1 to 300-M must communicate their respective group of sets to each other. This is necessary so that each module 300-1 to 300-M can supplement its own group of sets to reflect the join attribute over all portions of the relations to be joined. This can be achieved if each module 300-1 to 300-M successively broadcasts its group of sets via the distribution medium 410. Alternatively, each of the modules 300-1 to 300-M can transmit its group of sets to a single attached general purpose computer 100 which disseminates the groups of sets to each module 300-1 to 300-M. Then, each module 300-1 to 300-M executes the second pass using its supplemented group of sets.

E. Multicycle Query Execution Using Partitioning

The partitioning method mentioned above for dividing the execution of a natural join query can be used for any arbitrary query. In such a case, the database may be partitioned into m portions, e.g., by hashing each tuple thereof on a particular attribute value. Alternatively, each tuple of the database may include an attribute for storing a random number assigned thereto (e.g., by the DSP 310 or general purpose computer 100). Illustratively, the database may be evenly partitioned into m portions based on the value stored in the random number attribute of each tuple. (For example, if the random numbers are selected from a domain of 1 to L, then tuples with the random attribute values from 1 to L/m are in a first portion, tuples with random attribute values from L/m+1 to 2L/m are in a second portion, ..., tuples with random attribute values from (m−1)·L/m+1 to L are in an $m^{th}$ portion.) The DSP 310 then executes the query against each portion of the database in a separate broadcast cycle.

That is, on an $i^{th}$ broadcast cycle (where i is an integer from 1 to m), the DSP 310 only executes the query against retrieved tuples in the $i^{th}$ portion. For example, the DSP 310 first determines if each retrieved tuple has a random attribute value between $(i-1) \cdot L/m+1$ and $i \cdot L/m$ (or determines if an appropriate hashed attribute value is in the range of $(i-1) \cdot N+1$ to $i \cdot N$, assuming that the hashing function returns one of 1 to N·m values). The DSP 310 then executes the query against those tuples which are in the above-specified range. Advantageously, however, the DSP 310 programs the loading logic 340 with appropriate instructions for only loading tuples of the $i^{th}$ portion into the buffer memory 350 on the $i^{th}$ broadcast cycle. This latter strategy can produce the decoupling benefits discussed above in section VI.A.1.

In summary, a novel broadcast database system module is disclosed having a processor and a memory subsystem. The processor and memory subsystem of the broadcast database system module can cooperate to provide all features of a broadcast database system such as the pump function, data filter function, database mirror function, etc. The memory subsystem can transfer attribute information of broadcasted tuples to the processor and the processor can execute queries against the attribute information of tuples. Alternatively or additionally, the memory subsystem stores all or part of a database and broadcasts all or part of this database information stored therein. Likewise, the processor can maintain a database stored in the memory subsystem according to instructions to add information to, delete information from, or modify information in, the database.

Finally, the aforementioned embodiments are intended to merely illustrate the invention. Numerous other embodiments may be devised by those having ordinary skill in the art without departing from the spirit and scope of the following claims.

What is claimed:

1. A multi-function database system module for broadcasting database tuples containing attribute information, for maintaining a local copy of such tuples, and for executing queries with respect to such tuples, said module comprising:

a memory subsystem including means for receiving information from a source external to said module, storage means including a buffer memory and a storage memory for storing a local copy of such information, and means for broadcasting such information from said storage means both within the module and external to the module, and a processor for executing queries directed to such information in said memory system and for determining the function to be performed by the module in response to such queries and wherein said memory subsystem further comprises first and second ports connected to said processor, said first and second ports for transferring attribute information to said processor, said second port also receiving said attribute information outputted from said processor, a third port for receiving externally broadcasted tuples and for transmitting tuples broadcasted from said memory subsystem; and a local memory which is connected to said second port, for storing information outputted from said processor, and wherein said storage memory is a first dual port memory connected to said second port and to said third port, for storing tuples and for broadcasting said stored tuples, and said buffer memory is a second dual port memory connected to said second port and to said third port, for receiving attribute information of said externally broadcasted tuples and said tuples broadcasted from said first dual port memory, and for transferring at least part of the received attribute information to said processor.

2. A multi-function database system module for broadcasting database tuples containing attribute information, for maintaining a local copy of such tuples, and for executing queries with respect to such tuples, said module comprising:

a memory subsystem including means for receiving information from a source external to said module, storage means including a buffer memory and a storage memory for storing a local copy of such information, and means for broadcasting such information from said storage means both within the module and external to the module, and a processor for executing queries directed to such information in said memory system and for determining the function to be performed by the module in response to such queries and wherein said memory system further comprises first and second ports connected to said processor, said first and second ports for transferring attribute information to said processor, said second port also receiving said attribute information outputted from said processor, a third port for receiving externally broadcasted tuples and for transmitting tuples broadcasted from said memory subsystem, and loading logic for controlling the receipt of attribute information into said buffer memory in response to said processor, and wherein said storage memory is a first dual port memory connected to said second port and to said third port, for storing tuples and for broadcasting said stored tuples, and said buffer memory is a second dual port memory connected to said second port and to said third port, for receiving attribute information of said externally broadcasted tuples and said tuples broadcasted from said first dual port memory, and for transferring at least part of the received attribute information to said processors.

3. The multi-function database system module of claim 2 wherein said loading logic measures characteristics of the transfer and receipt of said attribute information.

4. A multi-function database system module for broadcasting database tuples containing attribute information, for maintaining a local copy of such tuples, and for executing queries with respect to such tuples, said multi-function module comprising:

a memory subsystem including means for receiving information from a source external to said module, storage means including a buffer memory and a storage memory for storing a local copy of such information, and means for broadcasting such information from said storage means both within the module and external to the module, a processor for executing queries directed to such information in said memory system and for determining which of possible multiple functions is to be performed by the module in response to such queries, and a sequencer connected to said processor and said memory subsystem for causing said memory subsystem to broadcast tuples from, and to store externally broadcasted tuples in, said memory subsystem in response to instructions received from said processor.

5. The multi-function database system module of claim 4 wherein said memory subsystem further comprises loading logic for measuring characteristics of a transfer of attribute information of tuples broadcasted from said memory subsystem to said processor and for transmitting a signal to said sequencer depending on the measured characteristics for adjusting the rate at which said tuples are broadcasted.

6. A broadcast database system module comprising:

a processor for executing queries against attribute information of broadcasted tuples, and a memory subsystem for transferring said attribute information of said broadcasted tuples to said processor, said memory subsystem including means for decoupling the time intervals during which said tuples are broadcasted from the per tuple query execution time of said processor, and wherein said memory subsystem receives each of said broadcasted tuples in fixed length time intervals and transfers attribute information of said tuples to said processor in variable length time intervals, said variable length time intervals being on average less than or equal to said fixed length time intervals.

7. A broadcast database system comprising:

a shared distribution medium, and a plurality of multi-function broadcast database system modules connected to said shared distribution medium, each of said multi-function broadcast database system modules comprising a processor, and a memory subsystem for transferring attribute information of broadcasted tuples to said processor, said memory subsystem including means for storing a copy of one or more of said broadcasted tuples and for cyclically broadcasting particular ones of the stored tuples, and wherein at least one of said broadcast database system modules is a pump module and at least one of said broadcast database system modules is a database mirror module, wherein said tuples broadcasted from said at least one pump module are received at said memory system of said at least one database mirror module and wherein said memory subsystem of said at least one database mirror module includes storing means for maintaining an up-to-date copy of the broadcasted tuples, said memory subsystem of said at least one base mirror module broadcasting said tuples of said copy if said at least one pump module fails.

8. A broadcast database system comprising:

a shared distribution medium, and a plurality of multi-function broadcast database system modules connected to said shared distribution medium, each of said multi-function broadcast database system modules comprising a processor, and a memory subsystem for transferring attribute information of broadcasted tuples to said processor, said memory subsystem including means for storing a copy of one or more of said broadcasted tuples and for cyclically broadcasting particular ones of the stored tuples, and wherein at least one of said broadcast database system modules is a pump module and at least one of said broadcast database system modules is a data access manager module, wherein said tuples broadcasted from said at least one pump module are received at said one at least data access manager module, wherein said processor of said database access manager module executes queries against attribute information of said broadcasted tuples transferred from said memory subsystem of said database access manager module, and wherein the memory subsystem of said at least one data access manager module includes means for receiving and storing a snapshot of at least part of the tuples broadcasted thereto and means for locally broadcasting said snapshot within said memory system of said database access manager module.

9. A multi-function database system module comprising:

processing means for executing queries against attribute information of tuples, when said module functions as a data access manager, for maintaining a database, when said module functions as a pump, and for determining the function to be performed by said module, and memory means for storing said database maintained by said processing means and for cyclically broadcasting tuples of said stored database, when said module functions as a pump, and for transferring attribute information of broadcasted tuples to said processing means when said module functions as a data access manager, said memory means further comprising means for decoupling the fixed length time intervals in which said tuples are broadcasted from the per tuple query execution time of said processing means.

10. A method of operating a multi-function database system module to execute queries, said module including a memory subsystem and a processor, said method comprising the steps of:

using said processor, partitioning broadcasted tuples into sets by hashing a key attribute for each tuple, using said memory subsystem, transferring attribute information of said broadcasted tuples to said processor, using said processor, executing a query against attribute information of the partitioned broadcasted tuples, and using said processor, determining from said hashed key attribute value whether or not to execute a trigger procedure.

11. A multi-function database system module for broadcasting database tuples containing attribute information, for maintaining a local copy of such tuples, and for executing queries with respect to such tuples to perform one or more of a pump function, a data filter function, a database mirror function, and a snapshot function, said module comprising:

a memory subsystem including means for receiving information from a source external to said module, storage means including a buffer memory and a storage memory for storing a local copy of said information, and means for broadcasting such information from said storage means both within the module and external to the module, and a processor for executing queries directed to such information in said memory system and for determining which of said functions is to be performed by the module in response to such queries, said memory means further comprising means for decoupling the fixed length time intervals in which said tuples are broadcast from the per tuple query execution time of said processor.

12. A method of operating a multi-function database system module to execute queries, said module including a memory subsystem and a processor, said method comprising the steps of:

using said processor, partitioning broadcasted tuples into sets by hashing a key attribute for each tuple, using said memory subsystem, transferring attribute information of said broadcasted tuples to said processor, and using said processor, executing a query against attribute information of the partitioned, broadcasted tuples, and wherein said query is a join operation and said step of partitioning said tuples into sets by hashing occurs during a first pass, the method further comprising using said processor, selecting attribute information of said tuples partitioned and into said sets of a resultant joined relation during a second pass.

* * * * *